(12) United States Patent
Enescu et al.

(10) Patent No.: US 12,088,394 B2
(45) Date of Patent: Sep. 10, 2024

(54) BEAM INDICATION FOR MULTI-PANEL UE

(71) Applicant: Nokia Technologies Oy, Espoo (FI)

(72) Inventors: Mihai Enescu, Espoo (FI); Sami Hakola, Kempele (FI); Lars Dalsgaard, Oulu (FI); Jorma Kaikkonen, Oulu (FI); Timo Koskela, Oulu (FI); Juha Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/582,412

(22) Filed: Jan. 24, 2022

(65) Prior Publication Data

US 2022/0149925 A1 May 12, 2022

Related U.S. Application Data

(63) Continuation of application No. 17/043,384, filed as application No. PCT/IB2019/052840 on Apr. 5, 2019, now Pat. No. 11,271,635.

(60) Provisional application No. 62/653,824, filed on Apr. 6, 2018.

(51) Int. Cl.
*H04B 7/02* (2018.01)
*H04B 7/08* (2006.01)
*H04L 5/00* (2006.01)
*H04W 52/36* (2009.01)
*H04W 72/044* (2023.01)
*H04W 72/23* (2023.01)

(52) U.S. Cl.
CPC ........... *H04B 7/088* (2013.01); *H04B 7/0877* (2013.01); *H04L 5/0023* (2013.01); *H04L 5/0048* (2013.01); *H04W 52/365* (2013.01); *H04W 72/046* (2013.01); *H04W 72/23* (2023.01)

(58) Field of Classification Search
CPC ..... H04B 7/088; H04B 7/0877; H04L 5/0023; H04L 5/0048; H04W 52/365; H04W 72/046; H04W 72/1289
USPC ........ 375/267, 261, 260, 259, 219, 295, 316
See application file for complete search history.

(56) References Cited

U.S. PATENT DOCUMENTS

| | | | |
|---|---|---|---|
| 2014/0185481 A1 | 7/2014 | Seol et al. | 370/252 |
| 2014/0323143 A1 | 10/2014 | Jung et al. | 455/452.1 |
| 2017/0339675 A1 | 11/2017 | Liu et al. | 72/42 |
| 2018/0115957 A1* | 4/2018 | Lin | H04W 52/365 |

(Continued)

FOREIGN PATENT DOCUMENTS

| | | |
|---|---|---|
| CN | 103828257 A | 5/2014 |
| CN | 104106223 A | 10/2014 |

(Continued)

OTHER PUBLICATIONS

"3rd Generation Partnership Project; Technical Specification Group Radio Access Network; NR; Physical layer procedures for data (Release 15)", 3GPP TS 38.214, V15.0.0, Dec. 2017, pp. 1-71.

(Continued)

*Primary Examiner* — Zewdu A Kassa
(74) *Attorney, Agent, or Firm* — Joseph C. Drish; Harrington & Smith

(57) ABSTRACT

A method includes receiving, at a user device, a configuration for beam reporting, where the configuration comprises one of: an indication to provide separate reporting for downlink beam selection and uplink beam selection; or an indication to provide reporting for uplink beam selection.

26 Claims, 14 Drawing Sheets

(56) References Cited

U.S. PATENT DOCUMENTS

| | | | |
|---|---|---|---|
| 2018/0227094 A1* | 8/2018 | Liu | H04B 7/06966 |
| 2018/0249453 A1* | 8/2018 | Nagaraja | H04B 7/0632 |
| 2018/0288645 A1* | 10/2018 | Lee | H04B 17/382 |
| 2019/0349124 A1* | 11/2019 | Tang | H04L 25/0226 |
| 2019/0394664 A1* | 12/2019 | Sun | H04W 24/02 |
| 2020/0145079 A1* | 5/2020 | Marinier | H04W 56/0045 |
| 2020/0213993 A1* | 7/2020 | Liu | H04W 72/51 |
| 2020/0245264 A1* | 7/2020 | Iwai | H04W 52/325 |
| 2021/0051667 A1 | 2/2021 | Yang | |

FOREIGN PATENT DOCUMENTS

| | | |
|---|---|---|
| CN | 104982063 A | 10/2015 |
| CN | 107534467 A | 1/2018 |
| CN | 107852220 A | 3/2018 |
| KR | 20140084821 A | 7/2014 |
| KR | 20170085428 A | 7/2017 |
| WO | WO-2017/049599 A1 | 3/2017 |
| WO | WO-2017/084235 A1 | 5/2017 |
| WO | WO-2017/123060 A1 | 7/2017 |
| WO | WO-2017/193773 A1 | 11/2017 |
| WO | WO-2017192889 A1 | 11/2017 |
| WO | WO-2018-060928 A1 | 4/2018 |
| WO | WO-2018062937 A1 | 4/2018 |

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.0.0, Dec. 2017, pp. 1-68.

International Search Report and Written Opinion received for corresponding Patent Cooperation Treaty Application No. PCT/IB2019/052840, dated Nov. 25, 2019, 19 pages.

"Details and Evaluation Results on Beam Indication", 3GPP TSG RAN WG1 Meeting #91, R1-1719538, Agenda : 7.2.2.6, ZTE, Nov. 27-Dec. 1, 2017, 11 pages.

"On Beam Grouping Reporting in NR", 3GPP TSG-RAN WG1#88, R1-1703160, Agenda : 8.1.2.2.1, Nokia, Feb. 13-17, 2017, 7 pages.

"Discussions on NR UL Multi-TRP and Multi-panel Support", 3GPP TSG RAN WG1 Meeting #89, R1-1707949, Agenda : 7.1.2.1.7, Samsung, May 15-19, 2017, 3 pages.

"Issues on beam management", Samsung, 3GPP TSG RAN WG1 Meeting AH 1801, R1-1800432, Jan. 2018, 12 pages.

"CSI-MeasConfig signaling structure", Ericsson, 3GPP TSG-RAN WG2#101, Tdoc R2-1803961, Feb. 2018, 37 pages.

"Discussion on DL beam management", CATT, 3GPP TSG RAN WG1 Meeting #89, R1-1707475, May 2017, 10 pages.

* cited by examiner

| TCI INDEX ~210 | SOURCE RS SET ~220 | SOURCE RS INDEX ~230 | QCL TYPE ~240 |
|---|---|---|---|
| 0 | RS SET #A | SS/PBCH BLOCK #n (OF SET #A) | A+D |
| 1 | RS SET #B | TRS #b (OF SET #B) | A |
|  |  | CSI-RS #c (OF SET #B) | D |
| ... | ... | ... | ... |
| M−1 | RS SET #E | CSI-RS #b (OF THE SET #E) | A+D |

| TCI INDEX (210) | SOURCE RS SET (220) | SOURCE RS INDEX/PANEL INDEX (710) | QCL TYPE (240) |
|---|---|---|---|
| 0 | RS SET #A | SS/PBCH BLOCK #n (OF SET #A)/PANEL #n | A+D |
| 1 | RS SET #B | TRS #b (OF SET #B)/PANEL #n | A |
| | | CSI-RS #c (OF SET #B)/PANEL #m | D |
| ... | ... | ... | ... |
| M−1 | RS SET #E | CSI-RS #b (OF THE SET #E)/PANEL #n | A+D |

FIG.7

| TCI INDEX (210) | SOURCE RS SET (220) | SOURCE RS INDEX (230) | QCL TYPE (240) | TCI MASK #1 (810) | TCI MASK #2 (820) |
|---|---|---|---|---|---|
| 0 | RS SET #A | SS/PBCH BLOCK #n (OF SET #A) | A+D | 1 | 1 |
| 1 | RS SET #B | TRS #b (OF SET #B) | A | 1 | 0 |
| | | CSI-RS #c (OF SET #B) | D | 1 | 0 |
| ... | ... | ... | ... | ... | ... |
| M−1 | RS SET #E | CSI-RS #b (OF THE SET #E) | A+D | 0 | 0 |

FIG.8

BEAM INDICATION FOR MULTI-PANEL UE

RELATED APPLICATION

This application is a continuation of U.S. patent application Ser. No. 17/043,384, filed Sep. 29, 2020, which is incorporated herein by reference in its entirety, which is a National Stage Entry of International Application No. PCT/IB2019/052840, filed Apr. 5, 2019, which is incorporated herein by reference in its entirety, which claims priority to U.S. Provisional Patent Application No. 62/653,824, filed Apr. 6, 2018, which is incorporated herein by reference in its entirety.

TECHNICAL FIELD

The teachings in accordance with the exemplary embodiments of this invention relate generally to Radio Standards including physical layer (PHY), Medium access control (MAC), Radio Link Control (RLC), Radio Resource Control (RRC), etc., and particularly, to radio physical layer design. More specifically, teachings in accordance with the exemplary embodiments relate to beam management methods that support user equipment with different kind of beamforming capabilities.

BACKGROUND

At higher carrier frequencies, for example, at carrier frequencies above 6 GHz, user equipment (UEs) often have multiple transmit and receive antenna panels and operate using narrower RF beams than omni pattern for both the reception and transmission. As an example, a UE may be equipped with four cross-polarized antenna panels. In contrast to number of panels, there may be a limited number of transceiver units (TXRUs) available at the UE. For instance, a UE may have only two TXRUs while having four x-pol antenna panels. In that instance only one x-pol panel or two one-dimensional panels may be in use at a time (for example, one TXRU per polarization dimension per panel). Changing a TX or RX beam "within a panel" may be performed within some tens to hundred nanoseconds but switching beam between panels, for example, changing operating panel, may require (in the order of) a hundred microseconds to some milliseconds (time from trigger to switch on the panel until the panel is operable). A delay (for example, a two microsecond delay) may be assumed (for example, the system or UE may operate based on an assumption) for the UE being operative again when switching active antenna panel.

A common Quasi-colocation (QCL) and Transmit Configuration Indication (TCI) framework may be used for defining a "transmit beam" for different downlink physical signals and channels, such as for periodic, semi-persistent and aperiodic CSI-RS, and NR-PDCCH and NR-PDSCH in NR. In these instances, the UE may be configured with a TCI table in which each row/state is associated with one or two RSs that act as a source RS(s) in terms of different QCL parameters (delay spread, average delay, doppler spread, doppler shift, spatial RX, etc.) for the particular downlink signal. In instances in which spatial RX QCL parameter is configured for the particular source RS, the UE may assume that the same RX beam can be applied when receiving the configured/scheduled/triggered physical signal or physical channel as was used for receiving the source RS.

Certain abbreviations that may be found in the description and/or in the Figures are herewith defined as follows:

AMF Access and Mobility Management Function
BWP Bandwidth part
CA Carrier aggregation
CC Component carrier
CCE Control channel element
CE Control Element
CORESET Control Resource Set
CRI CSI-RS Resource Indicator
CSI-RS Channel State Information Resource Set
CSS Common search space
DCI Downlink Control Information
DL Downlink
DMRS Demodulation Reference Signal
gNB 5G Enhanced Node B (Base station)
HARQ Hybrid Automatic Repeat Request
LTE long term evolution
MAC Medium access control
MEC multi-access edge computing
MME mobility management entity
MPR maximum power reduction
NCE network control element
NR New radio
NR-PDCCH New radio Physical Downlink Control Channel
N/W Network
PBCH Physical Broadcast Channel
PDCCH Physical Downlink Control Channel
PDSCH Physical Downlink Shared Channel
PHR power headroom
PL pathloss
PUCCH Physical Uplink Control Channel
PUSCH Physical Uplink Shared Channel
QCL Quasi Co-Location
RE Resource Element
RF Radio Frequency
RRC Radio Resource Control
RS Reference Signal
RSRP Reference Signal Received Power
SCS Subcarrier spacing
SRS sounding reference signal
SS Synchronization Signal
SSB Synchronization signal block
SSBRI SSB Resource Indicator
TCI Transmission Configuration Indication
TRP Transmission—reception point
TRS Tracking Reference Signal
TXRU Transceiver Unit
UE User Equipment
UL Uplink
UPF User Plane Function
5G Fifth generation mobile communication system

BRIEF SUMMARY

The following summary includes examples and is merely intended to be exemplary. The summary is not intended to limit the scope of the claims.

In accordance with one aspect, an example method comprises providing, from a user device, at least one beam report to a base station indicating a particular panel tag to use for measuring a particular beam management source reference signal; receiving, with the user device, from the base station, configuration of a transmission configuration indication table for the user device, wherein the configuration is based on the at least one beam report, wherein the transmission configuration indication table comprises states associated with at least one source reference signal measured with at least one of one or more receiver panels of the user device; and determining, with the user device, when activating at least one particular source reference signal for a control resource set, that only a transmission configuration indication state sharing a same panel tag with the at least one particular source reference signal is to be used for physical downlink shared channel beam indication.

In accordance with another aspect, an example apparatus comprises means for providing, from the apparatus, at least one beam report to a base station indicating a particular panel tag to use for measuring a particular beam management source reference signal; means for receiving, by the apparatus, from the base station, configuration of a transmission configuration indication table for the apparatus, wherein the configuration is based on the at least one beam report, wherein the transmission configuration indication table comprises one or more transmission configuration indication states associated with at least one source reference signal measured with at least one of one or more receiver panels of the apparatus; and means for determining, when activating at least one particular source reference signal for a control resource set, that only a transmission configuration indication state sharing a same panel tag with the at least one particular source reference signal is to be used for physical downlink shared channel beam indication.

In accordance with another aspect, an example apparatus comprises at least one processor; and at least one non-transitory memory including computer program code, the at least one non-transitory memory and the computer program code may be configured to, with the at least one processor, cause the apparatus to: provide at least one beam report to a base station indicating a particular panel tag to use for measuring a particular beam management source reference signal; receive from the base station configuration of a transmission configuration indication table for the apparatus, wherein the configuration is based on the at least one beam report, wherein the transmission configuration indication table comprises states associated with at least one source reference signal measured with at least one receiver panel of the apparatus; and determine, when activating at least one particular source reference signal for a control resource set in the transmission configuration indication table, that only transmission configuration indication states sharing a same panel tag with the at least one particular source reference signal are to be used for physical downlink shared channel beam indication.

In accordance with another aspect, an example apparatus comprises a non-transitory program storage device readable by a machine, tangibly embodying a program of instructions executable by the machine for performing operations, the operations comprising: providing at least one beam report to a base station indicating a particular panel tag to use for measuring a particular beam management source reference signal; receiving from the base station configuration of a transmission configuration indication table for the apparatus, wherein the configuration is based on the at least one beam report, wherein the transmission configuration indication table comprises states associated with at least one source reference signal measured with at least one receiver panel of the apparatus; and determining, when activating at least one particular source reference signal for a control resource set in the transmission configuration indication table, that only transmission configuration indication states sharing a same panel tag with the at least one particular source reference signal are to be used for physical downlink shared channel beam indication.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 shows an example illustration of a TCI table configured for a UE;

FIG. 7 shows an example illustration of a TCI table configured for a UE;

FIG. 8 shows an example illustration of a TCI table configured for a UE;

DETAILED DESCRIPTION

In the example embodiments as described herein a method and apparatus that provides multi-beam downlink channel control procedures.

Figure 1:
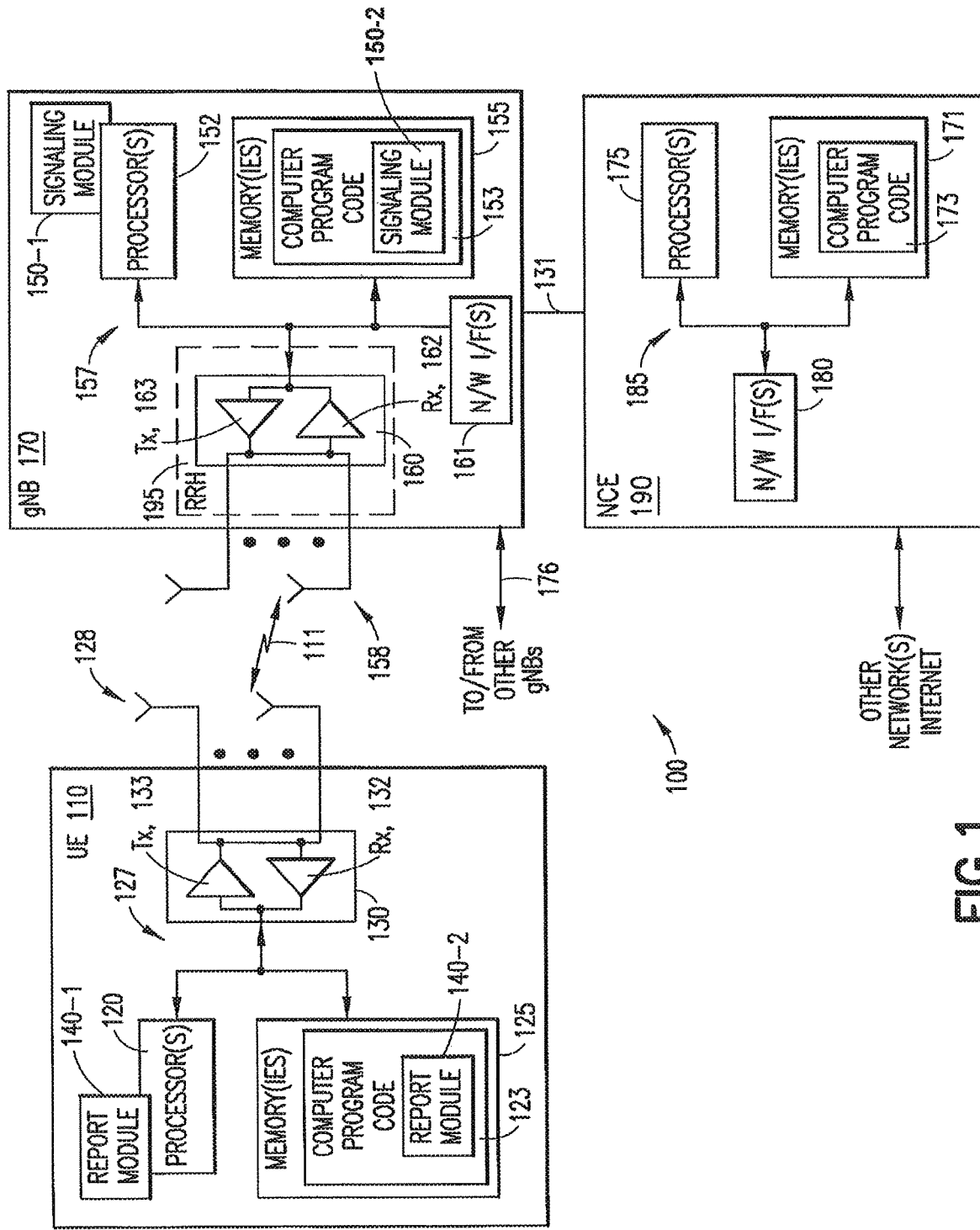
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, a user equipment (UE) 110 is in wireless communication with a wireless network 100. UE 110 is a wireless, typically mobile device that can access a wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a report module 140, comprising one of or both parts 140-1 and/or 140-2, which may be implemented in a number of ways. The report module 140 may be implemented in hardware as report module 140-1, such as being implemented as part of the one or more processors 120. The report module 140-1 may be implemented also as an integrated circuit or through other hardware such as a programmable gate array. In another example, the report module 140 may be implemented as report module 140-2, which is implemented as computer program code 123 and is executed by the one or more processors 120. For instance, the one or more memories 125 and the computer program code 123 may be configured to, with the one or more processors 120, cause the UE 110 to perform one or more of the operations as described herein. The UE 110 communicates with gNB 170 via a wireless link 111.

The gNB (NR/5G Node B but possibly an evolved NodeB) 170 is a base station (e.g., for LTE, long term evolution, or for NR, New Radio) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a signaling module 150, comprising one of or both parts 150-1 and/or 150-2, which may be implemented in a number of ways. The signaling module 150 may be implemented in hardware as signaling module 150-1, such as being implemented as part of the one or more processors 152. The signaling module 150-1 may be implemented also as an integrated circuit or through other hardware such as a programmable gate array. In another example, the signaling module 150 may be implemented as signaling module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB 170 that forms the cell will perform the functions. The cell makes up part of a gNB 170. That is, there can be multiple cells per gNB 170. Each cell may contain one or multiple transmission and receiving points (TRPS).

The wireless network 100 may include a network control element (NCE) 190 that may include AMF (Access and Mobility Management Function)/UPF (User Plane Function) functionality, and which provides connectivity with a further network, such as a telephone network and/or a data communications network (e.g., the Internet). The gNB 170 is coupled via a link 131 to the NCE 190. The link 131 may be implemented as, for example, an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, NCE 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio access network and fully centralized in the core network. The low latency requires bringing the content close to the radio, which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomous self-healing networks, remote cloud services and augmented reality. In radio communications, using edge cloud may mean node operations are to be carried out, at least partly, in a server, host or node operationally coupled to a remote radio head or base station comprising radio parts. It is also possible that node operations will be distributed among a plurality of servers, nodes or hosts. It should be understood that the distribution of labor between core network operations and base station operations in 5G may differ from that of the LTE or even be non-existent. Some other technology advancements probably to be used are Software-Defined Networking (SDN), Big Data, and all-IP, which may change the way networks are being constructed and managed.

Having thus introduced one suitable but non-limiting technical context for the practice of the example embodiments of this invention, the example embodiments will now be described with greater specificity.

FIG. 2 illustrates an example TCI table 200 configured for a UE 110. Table 200 includes columns for a TCI index 210, a source RS set 220, a source RS index 230 and a QCL type 240.

For determining the transmit beam for the NR-PDCCH, each CORESET may be associated to one or multiple TCI states. In instances in which the CORESET is associated with more than one TCI state, MAC-CE level activation signalling may be used to control which one of the multiple TCI states is active at a time per CORESET. Search space set may define PDCCH monitoring related time domain parameters, such as monitoring periodicity. In other words, search space parameters may provide UE 110 information regarding when to try detecting NR-PDCCH from the particular CORESET. The CORESET defines physical time and frequency resources on which NR-PDCCH can be transmitted. Search space set related parameters associated to the CORESET may define a time domain monitoring pattern from which the UE 110 may determine when to monitor particular (for example, certain) CORESET. The UE may then determine how to set its RX beam from associated (active) TCI state of the CORESET. With regard to PDCCH beam indication, for example, a UE 110 may be configured with up to 3 CORESETs and together 10 search space sets within a configured bandwidth part (MVP).

FIG. 2 provides an exemplary TCI table 200 configured for the UE 110 in which QCL type 240 A means (for example, corresponds to) Doppler spread, Doppler shift, delay spread, average delay, and QCL type 240 D means (for example, corresponds to) spatial RX. Thus, when TCI index 210 0 determines source RS set(s) 220 for a particular physical signal or channel, the UE 110 may determine that it can set its RX beam for receiving the SS/PBCH block #n (based on the corresponding source RS index 230). Correspondingly, when TCI index 210 1 determines source RS set(s) 220 for a particular physical signal or channel, the UE 110 may determine that it can set its RX beam for receiving the CSI-RS #c (of RS set #B) (based on the corresponding source RS index 230).

Figure 3:
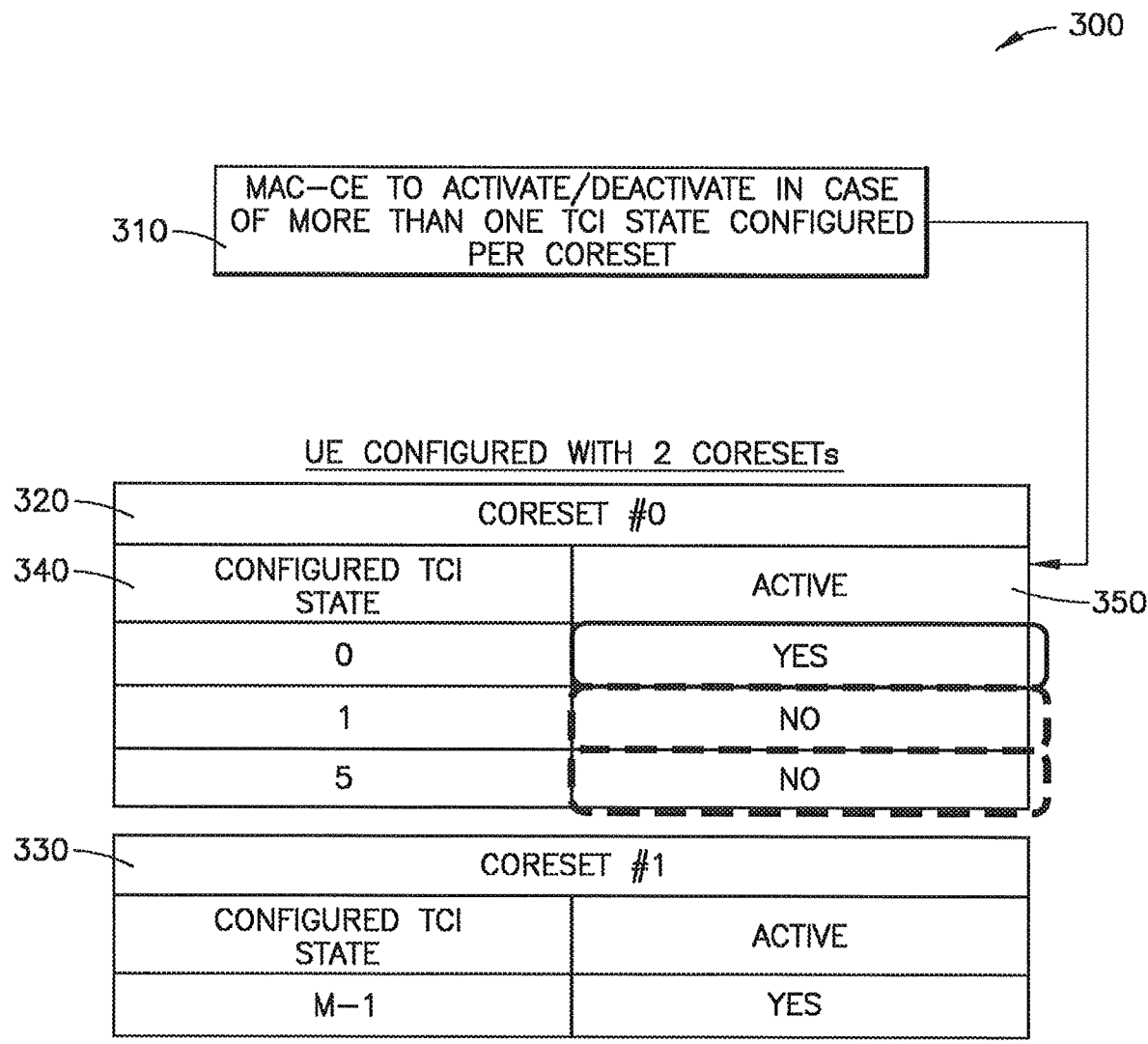
FIG. 3 shows an example illustration of two exemplary CORESET configurations showing (only) association to certain TCI state(s)

FIG. 3 illustrates an instance 300 in which UE 110 has been configured with two CORESETs (320, 330) with one or multiple TCI state associations (i.e., configured TCI state 340). For the CORESET #0 320, MAC-CE signaling 310 may be used to activate one TCI state at a time (configured TCI state 340 0 is active 350, Yes, while the remaining configured TCI states 340 (1 and 5) are not active (active 350, No)). For CORESET #1 330, the configured TCI state M-1 is active. M-1 is a TCI state index that defines the table size as a variable M.

Figure 4:
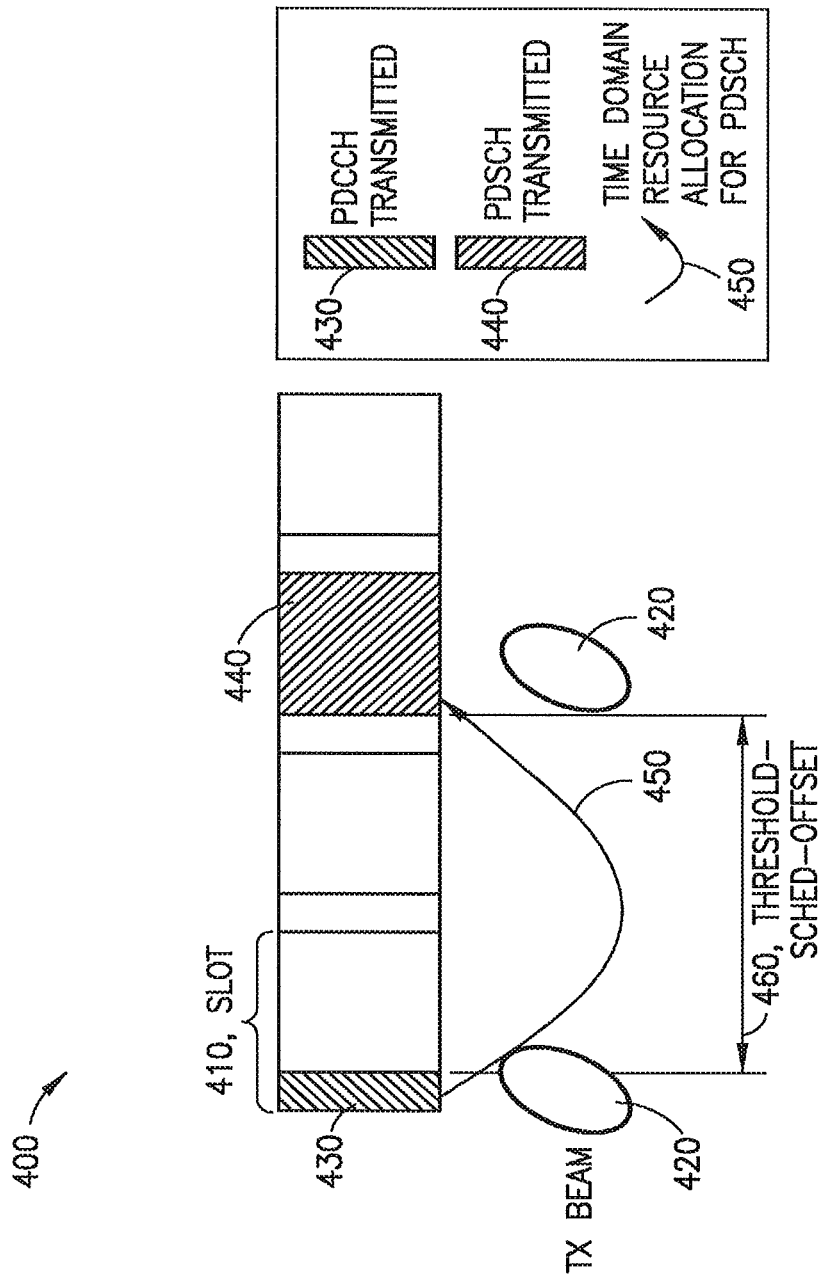
FIG. 4 shows an example illustration in which a TX beam for PDSCH is the same as for the PDCCH.
Figure 5:
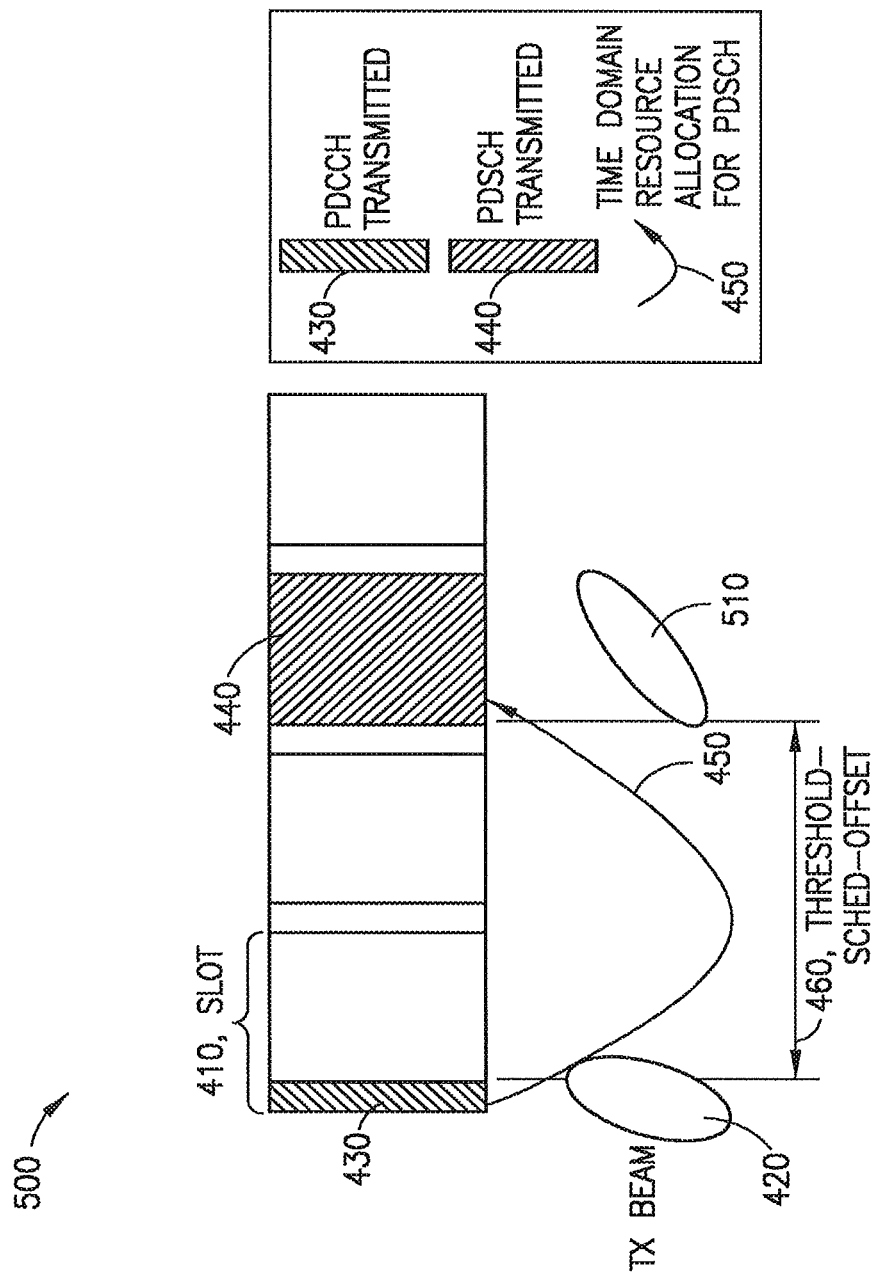
FIG. 5 shows an example illustration in which a TX beam for PDSCH is indicated by TCI index in DCI.
Figure 6:
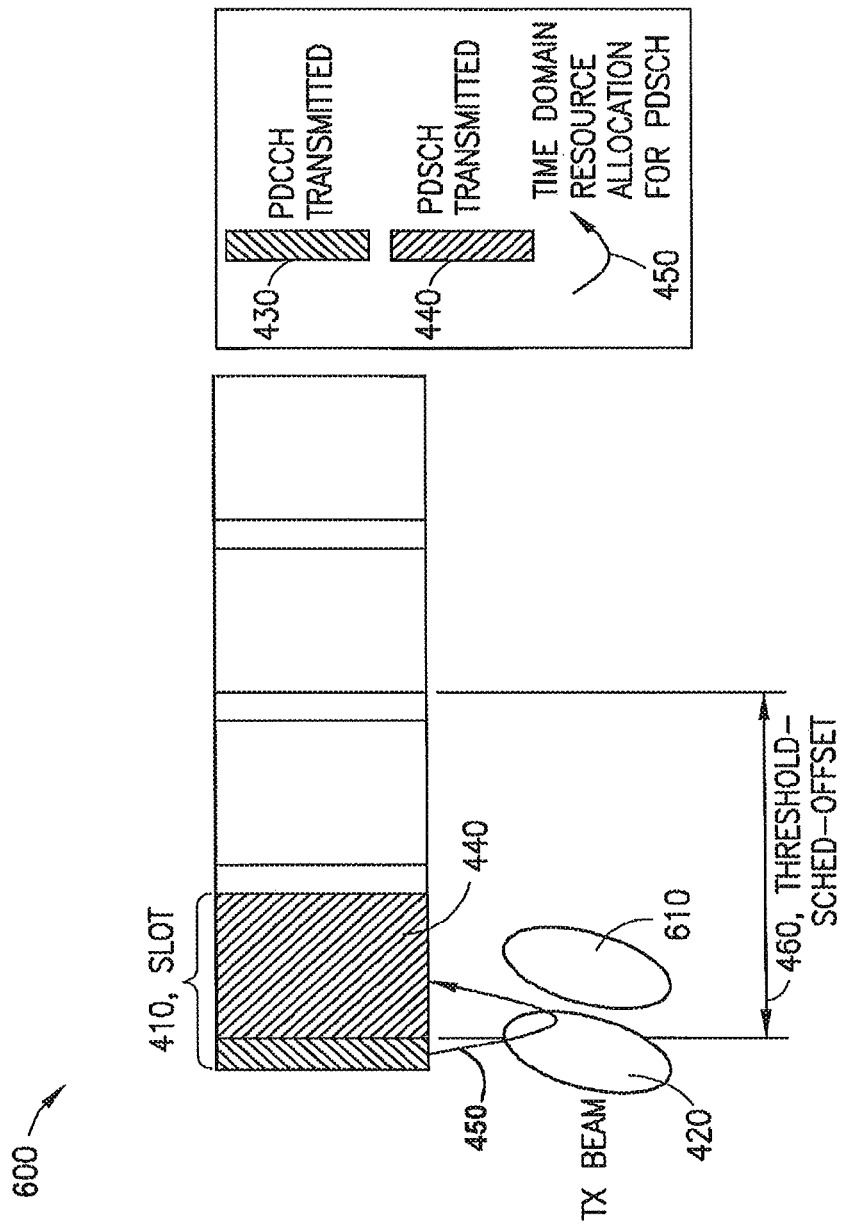
FIG. 6 shows an example illustration in which a TX beam for PDSCH corresponds to PDCCH TX beam of the lowest CORESET-ID in the latest slot.

For PDSCH beam indication, three implementation options are available as shown with regard to FIGS. 4, 5, and 6.

As described with respect to FIG. 4, a default mode 400 for PDSCH beam indication is shown. The slots 410 may receive PDCCH transmitted 430, PDSCH transmitted 440 and time domain resource allocation for PDSCH 450. PDCCH 430 (particularly, Downlink Control Info (DCI) transmitted in PDCCH) provides resource allocation for PDSCH 440. One component is time domain resource allocation for PDSCH 450 where PDCCH 430 gives the starting slot index (and symbol index within the slot) where PDSCH 440 allocation starts. Starting slot is counted from the PDCCH 430. For example, slot allocation may indicate that PDSCH 440 will start in slot n+2 where PDCCH 430 (providing slot allocation) is transmitted in slot n, here 410.

PDSCH beam indication method may be controlled by a higher layer parameter (for example, TCI-PresentInDCI) and the offset (Threshold-Sched-Offset 460) between the reception of the DCI and the corresponding PDSCH. TCI-PresentInDCI may be configured per CORESET. If TCI-PresentInDCI is set as 'Disabled' for the CORESET scheduling the PDSCH 440 or the PDSCH 440 is scheduled by a DCI format 1_0, TX beam 420 for PDSCH 440 may be the same as for the PDCCH 430. DCI format 1_0 is a compact or fallback downlink control info (DCI) format to schedule, for example, PDSCH 440. There is no TCI state index field in format 1_0 that can be found from 1_1 format.

As described with respect to FIG. 5, a dynamic mode 500 that may allow different TX beam 510 (for example, more narrow, different TRP, etc.) for PDSCH 440 (than the TX beam 420 for PDCCH 430) is shown. The slots 410 may receive PDCCH transmitted 430, PDSCH transmitted 440 and time domain resource allocation for PDSCH 450.

If the TCI-PresentInDCI is set as 'Enabled' and time offset between the reception of the DCI and the corresponding PDSCH 440 may be equal to or greater than a threshold Threshold-Sched-Offset 460, TX beam 510 for PDSCH 440 may be indicated by TCI index in DCI. For example, the threshold 460 may include numbers 1 and 2 slots 410 (for example, 120 kHz SCS). There will be a threshold 460 for time between PDCCH 430 and PDSCH 440. For example, assume threshold 460 is 2 slots 410. If PDSCH 440 is coming 1 slot 410 after PDCCH 430, a default TX beam 420 is applied for PDSCH 440. If PDSCH 440 is coming 3 slots 410 after PDCCH 430 (greater than threshold 460), the transmit beam 510 is applied for PDSCH 440, which is indicated by TCI index in PDCCH 430 DCI.

As described with respect to FIG. 6, a fallback mode 600 with one CORESET and in case PDSCH 440 follows PDCCH 430, Default mode is shown. The slots 410 may receive PDCCH transmitted 430, PDSCH transmitted 440 and time domain resource allocation for PDSCH 450.

If the TCI-PresentinDCI is set as 'Enabled'/'Disabled' and time offset between the reception of the DCI and the corresponding PDSCH 440 is less than a threshold Threshold-Sched-Offset 460, TX beam 610 for PDSCH 440 may correspond to PDCCH TX beam 420 of the lowest CORESET-ID in the latest slot 410 in which one or more CORESETs are configured for the UE 110.

The controlling parameter Threshold-Sched-Offset 460 may be a predetermined parameter, for example Threshold-Sched-Offset 460 may be one or two slots 410, assuming 120 kHz SCS. In such instances, the threshold for dynamic beam indication for PDSCH 440 may be around 125-250 microseconds. For example, when PDSCH 440 is scheduled after one or two slots 410 later than PDCCH 430, the PDSCH 440 may be transmitted with different transmit beam 610 than the PDCCH 430.

FIG. 7 provides an example TCI table 700 configured for the UE 110. Table 700 includes columns for a TCI index 210, a source RS set 220, a source RS index/panel index 710 and a QCL type 240.

In one possible implementation, the gNB 170 may configure a TCI table 700 for the UE 110 where the TCI states may be associated to source RSs measured by different UE 110 RX panel (source RS index/panel index 710). Tag may in general mean a set of receive spatial filters the UE 110 may be able to use simultaneously. UE 110 may "earmark" beam reports on certain transmit beams with a certain tag which it can receive simultaneously (or is willing to receive simultaneously). UE 110 may use only one panel at a time and need to switch from one panel to another when doing measurements over all the panels. In this case, the tag would refer to one panel. UE 110 may be able to use two panels at a time and could use the same tag for both panels, for example, tag would refer to what UE 110 may measure simultaneously. UE 110 may determine whether it will report tag per panel or tag per panel group (if UE 110 may be able to use multiple panels at a time).

Tag may be defined as a set of RX beams among which the beam switch doesn't require any additional delay (can be handled, for example, within a Cyclic prefix in OFDM (CP) in OFDM modulation. CP may be used to account for channel delay spread). To build gNB 170 awareness of which panels UE 110 would use to receive certain transmit beams, the UE 110 may provide gNB 170 with beam reports indicating, with panel tag, which panel is used for measuring certain beam management (BM) source RS. Beam management may provide a framework used for beam indication, beam reporting for downlink and uplink signals and channels, etc. Tag may be omitted by the UEs 110 capable of receiving simultaneously with all the panels. When activating particular source RS for the CORESET, the UE 110 may determine that only TCI states sharing the same tag with the activated source RS for the CORESET can be used for PDSCH 440 beam indication provided by DCI in PDCCH 430 of the CORESET and, for example, for semi-persistent CSI-RS beam indication. Consequently, UE 110 may deactivate TCI states of which source RSs are not sharing the same tag and the UE 110 may deactivate semi-persistent resource (if such semi-persistent resource exists) if the source RS doesn't share the same tag. This implicit UE 110 behaviour based on reported tag(s) may be configurable. For example, the UE 110 behavior may be implicit without configuration from gNB 170 to use the behavior, or, alternatively, UE 110 behavior may require first configuration from gNB 170.

FIG. 7 illustrates an example of the configured TCI table 700 in which the proposed panel tag may be provided at the panel indexes 710 corresponding to TCI index 210, 1 for QCL types 240, A and D (shown, by way of illustration in FIG. 7, as TRS #b (of set #B)/panel #n, and CSI-RS #c (of set #B)/panel #m, respectively).

Panel tag may be configured, for example, to all TCI states or only to TCI states that have QCL type 240 D configured. Each TCI state (with QCL type 240 D) may have a panel tag/index which may be the same or different (for example, same tag may mean that UE 110 can receive transmit beams defined by TCI states having same tag using the same receive panel (tag)). Different tags for TCI states may mean that UE 110 is required to have different panels to receive transmit beams defined by TCI states.

If the UE 110 is configured with a CSI-ReportConfig, the higher layer parameter ReportQuantity may be set to 'CRI-TRSRP' or 'SSBRITRSRP'.

If the UE 110 is configured with the higher layer parameter group-based-beam-reporting set to 'OFF', the UE 110 may not be required to update measurements for more than 64 [CSI-RS and/or SSB] resources, and the UE 110 may (or, alternately, must) report in a single report nrofReportedRS (number of reported RS, higher layer configured) different [CRI or SSBRI (SSB Resource Indicator)] for each report setting and the corresponding Rx-panel-tag.

If the UE 110 is configured with the higher layer parameter group-based-beam-reporting set to 'ON', the UE 110 may not be required to update measurements for more than 64 [CSI-RS and/or SSB] resources, and the UE 110 may report in a single reporting instance two different resources [CRI or SSBRI] for each report setting and the corresponding receiver panel tag (Rx-panel-tag), where [CSI-RS and/or SSB] resources may be received simultaneously by the UE 110 either with a single spatial domain receive filter, or with multiple simultaneous spatial domain receive filters. UE 110 may report in a single reporting instance multiple resources, which may be both CSI-RS resources indexed using CRI (CSI-RS resource indicator) and SSB resources indexed using SSBRI (SSB resource indicator), for each report setting and the corresponding RX-panel-tag where resources may be received simultaneously.

Example embodiments may be provided with regard to features of NR, such as x.y.z beam management and UE 110 power saving. UE 110 may be configured to provide group based beam reports where the UE 110 indicates within a beam report on which RX panel the UE 110 has measured the configured beam management RSs (SSB or CSI-RS). Based on the received beam report, the gNB 170 may be able to optimize the TCI configuration and set of activated TCI states so that UE 110 is able to operate with minimum number of panels at a time without sacrificing performance.

According to example embodiments, specified beam indication and reporting functionality may not support UEs 110 with limited beamforming capabilities, for example as described herein above. For example, limited beamforming capabilities UEs 110 may include UEs 110 that may have less TXRUs than antenna panels, or UEs 110 that may operate with a subset of active TXRUs and panels for power saving reasons. gNB 170 may not be aware of the UE's 110 receive panel per each beam report (beam measurement on configured SSB or CSI-RS resource for beam management measurement). Thus, gNB 170 may be required to operate based on a worst case assumption always that UE 110 needs to activate/switch to alternative panel. As discussed, this activation may take several milliseconds, and always taking it into account delays the beam switch procedure, meaning potentially lower user throughput or disruption in communication. Additionally, from UE 110 perspective, the UE 110 may need to have all the panels active that have been used to measure any source RS configured in the TCI table (i.e. 700). Consequently, UE 110 may have low possibility to switch off the panels for power saving without sacrificing the performance.

The example embodiments provide beam indication and reporting functionality that support UEs 110 with limited beamforming capabilities. For example, as MAC-CE signaling is used to activate TCI states, for example, for PDCCH 430 and PDSCH 440, and if the assumed latency between the MAC-CE command (or HARQ-ACK sent to PDSCH 440 carrying the command) and time when the command is in effect is at least as long as the lead time at UE 110 to switch on the panel, a TCI framework may be able to provide some level of power saving possibilities for the UE 110. However, there may be a risk that if the latency is agreed to be long, for example a few microseconds to tens of microseconds, dynamic beam switch for PDCCH 430, PDSCH 440 (for example, a set of source RSs that may be indicated), semi-persistent CSI-RS and PUCCH may not be possible and thus support for mobility even with moderate speed may not be supported.

Example embodiments may provide efficient power saving possibilities for the UE 110 to compensate for the power consumption of active TXRUs and panels, for example, at the very wide bandwidths above 6 GHz when compared to below 6 GHz operation.

According to an example embodiment, available source RSs in spatial QCL sense (QCL type 240, D) for downlink beam indication may be determined by a spatial QCL mask which validates source RSs that may be inherited in spatial QCL sense from activated source RS of the active CORESET.

In another example embodiment, available source RSs in spatial QCL sense (QCL type 240, D) for downlink beam indication may be the ones that are reported with the same tag as the activated source RSs of the active CORESET where the tag corresponds to a particular UE 110 panel. Simultaneously without switching delay, for example, tag may be defined as a set of RX beams among which the beam switch doesn't require any additional delay. The active source RS of the active CORESET may determine the set of available TCI states. There may be multiple active CORESETs and thus the available source RSs under each source RS of the CORESET may be disjoint set of source RSs, partially overlapping set of RSs or the same set of RS.

FIG. 8 provides an example TCI table 800 configured for the UE 110. Table 800 includes columns for a TCI index 210, a source RS set 220, a source RS index 230, a QCL type 240, a TCI mask #1 810 and a TCI mask #2 820.

According to an example embodiment gNB 170 may configure a TCI table 800 for the UE 110 and also corresponding masks (for example, a TCI mask #1 810 and a TCI mask #2 820) that indicate to the UE 110 which TCI index 210 maybe applied for PDSCH 440 scheduling (of PDCCH 430). TCI table 800 may be configured by gNB 170 using RRC level signaling. TCI mask 810 or 820 may include a process to "activate" particular TCI states that are associated to particular UE 110 panel tag/index. Where the TCI masking process is applied, other TCI states in the TCI table 800 may be assumed by UE 110 to be deactivated. UE 110 may be configured with multiple masks, such as illustrated in FIGS. 8, 810 and 820, which may be set to be active. For a given mask sub-set of the TCI index 210, one or more masks may be set to 'inactive' (=0) so that UE 110 can assume it will not be scheduled using those TCI signals (and hence UE 110 may, in instances in which UE 110 selects a particular option, for example for power saving purposes, deactivate those antenna panels or other hardware required for reception of corresponding (reference) signals). Network 100 may, either via MAC-CE or RRC signaling, activate/deactivate selected TCI Mask(s) 810 and/or 820. Alternatively, the activation may be done, implicitly based on PDCCH 430 scheduling, by using TCI index 210 associated to a given mask 810 or 820.

In one example implementation aspect, UE 110 may indicate a subset of panels that UE 110 may be able to activate at the same time, for example, in instances UE 110 has panels #1, 2, 3, 4, it may indicate the combination of active panels for example, 1, and 2 or 3, and 4 or in any combination. This signaling may provide an additional indication to panel tag. In one alternative example, if UE 110 is configured to always activate the same subset of panels for measurement, UE 110 may indicate the subset of panels, for example, 2 panels under the same panel tag. In other words, the UE 110 may be configured to determine how (for example, in a particular arrangement) to group beam reports.

Further, UE 110 may be provided with information for example, in a form of masks (for example, a TCI mask #1 810 and a TCI mask #2 820) on the configured TCI indexes 210, which UE 110 may be prepared to receive. For example, a set of possible TCI indexes 210 that UE 110 is to expect (for example, is configured to receive) may be indicated, for example, in DCI. The TCI mask 810 or 820 may be based on the UE 110 selected grouping of receive spatial filters, where the spatial filter may be one panel or multiple panels, for example, two panels.

In an example dependent embodiment for the above example embodiments, based on grouped beam reports, the gNB 170 may transmit to UE 110 a triggering signal for preparation of change of TCI applicable TCI states from one tag to another tag, or for preparation of update of set of tags defining the available source RSs/TCI states for beam indication.

The triggering signal may provide a direction to switch on UE 110 panel that is to be used to receive downlink signals after certain time. This may be implemented using MAC-CE activation command and there may be two application delays defined. One application delay may be defined for the case when activated source RS belongs to a set of source RSs currently active. This application delay may be shorter. The other application delay may be defined for the case when an activated source RS doesn't belong to a set of source RSs currently active. This application delay may be longer than the application delay for the case when activated source RS belongs to a set of source RSs currently active. This application delay may be used for UEs 110 that are able to run multiple panels simultaneously, but for power saving purpose keep some of the panels switched off when possible.

Figure 9:
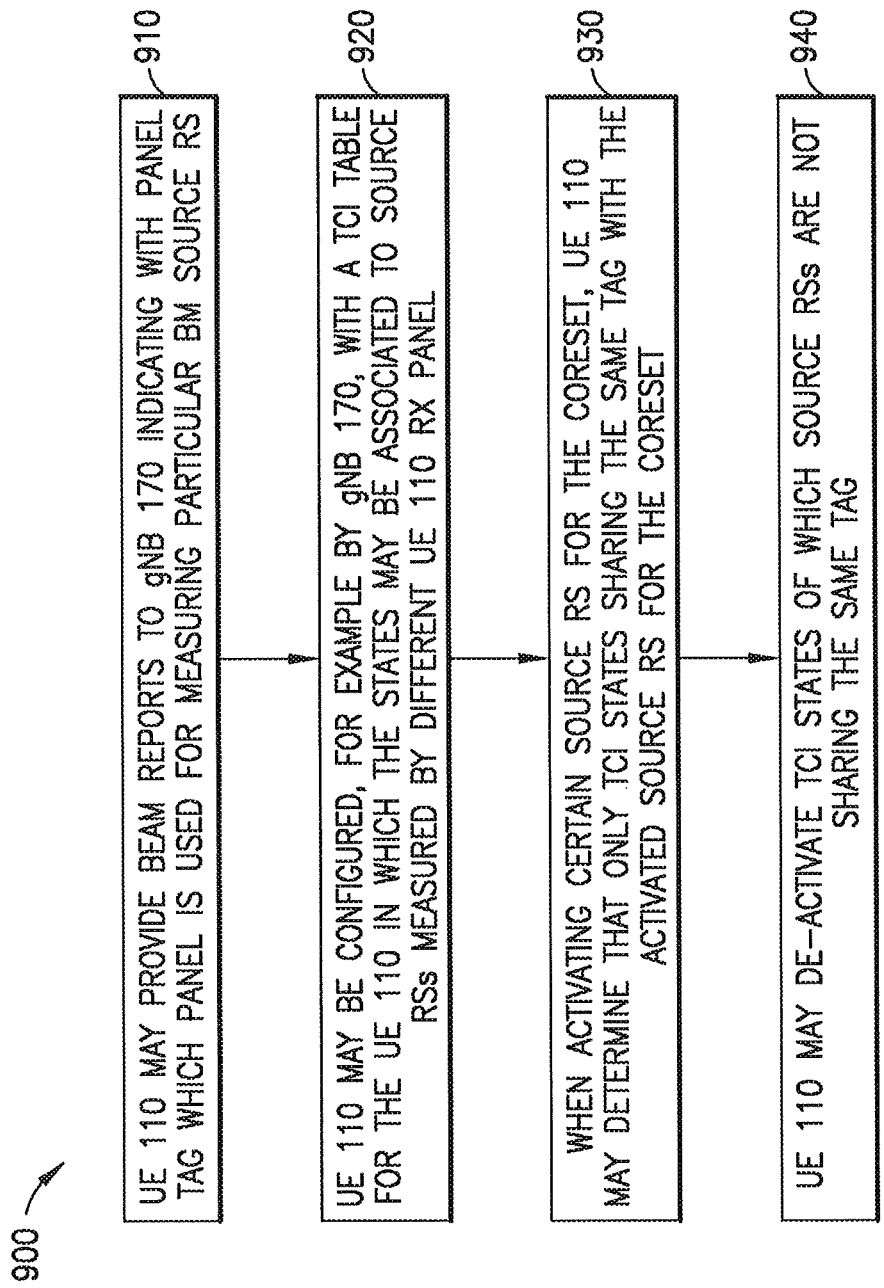
FIG. 9 shows a method in accordance with example embodiments which may be performed by an apparatus.

FIG. 9 is an example flow diagram 900 illustrating a method in accordance with example embodiments which may be performed by an apparatus.

At block 910, UE 110 may provide beam reports to gNB 170 indicating with panel tag which panel is used for measuring particular BM source RS. Tag can be omitted by the UEs 110 capable of receiving simultaneously with all the panels.

At block 920, UE 110 may be configured, for example by gNB 170, with a TCI table for the UE 110 in which the states may be associated to source RSs measured by different UE 110 RX panel, such as table 700, described with respect to FIG. 7 herein above.

At block 930, when activating certain source RS for the CORESET, UE 110 may determine that only TCI states sharing the same tag with the activated source RS for the CORESET can be used for PDSCH beam indication provided by DCI in PDCCH of the CORESET and, for example, for semi-persistent CSI-RS beam indication.

At block 940, UE 110 may de-activate TCI states of which source RSs are not sharing the same tag, and the UE 110 may de-activate semi-persistent resource (if such exists) if the source RS doesn't share the same tag.

Figure 10:
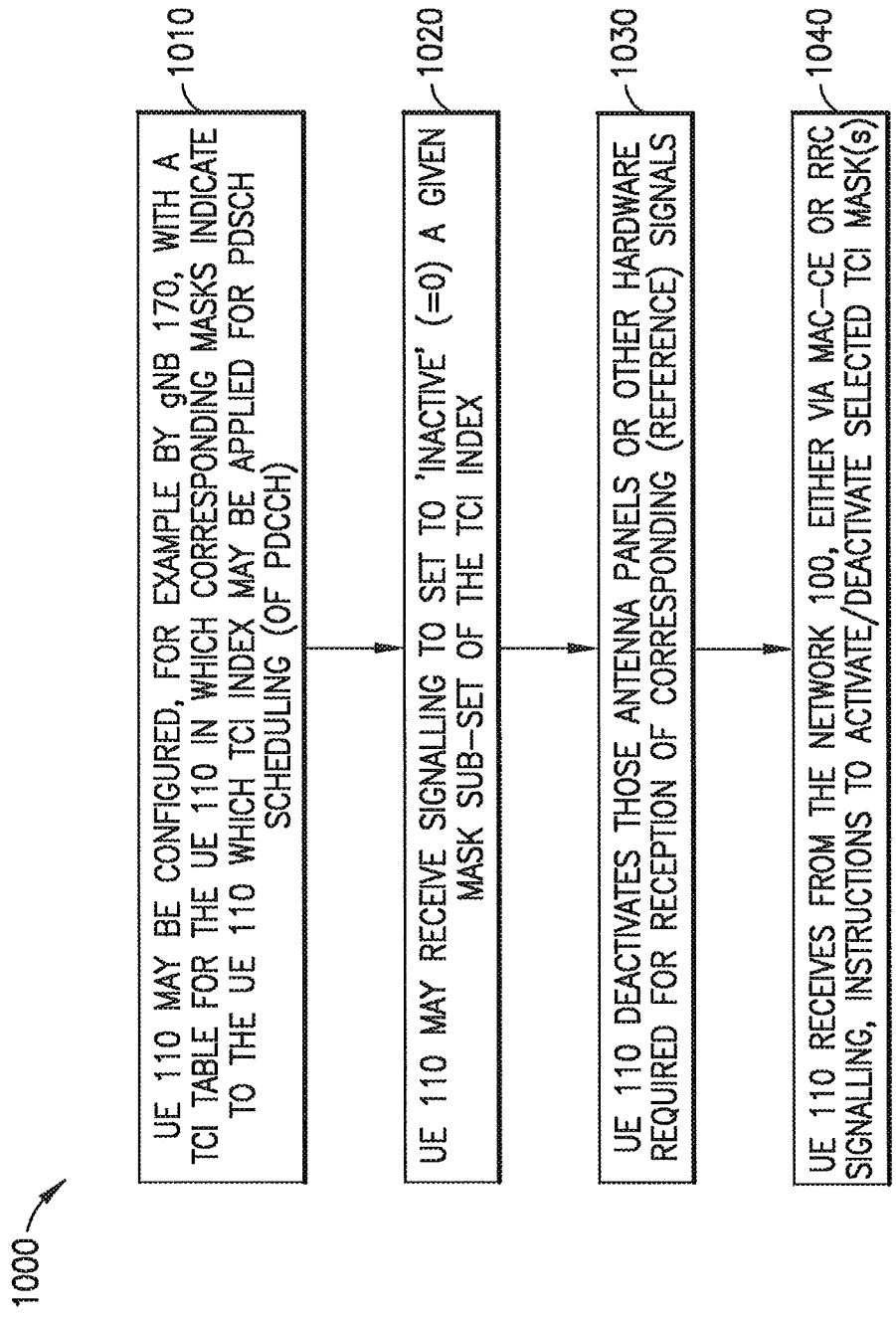
FIG. 10 shows a method in accordance with example embodiments which may be performed by an apparatus.

FIG. 10 is an example flow diagram 1000 illustrating a method in accordance with example embodiments which may be performed by an apparatus.

At block 1010, UE 110 may be configured, for example by gNB 170, with a TCI table for the UE 110 in which corresponding masks indicate to the UE 110 which TCI index may be applied for PDSCH scheduling (of PDCCH), such as table 800, illustrated in FIG. 8. UE 110 may be configured with multiple masks that may be set to be active.

At block 1020, UE 110 may receive signaling to set to 'inactive' (=0) a given mask sub-set of the TCI index, perhaps so that UE 110 may assume that it will not be scheduled using those TCI signals.

At block 1030, UE 110 may, if it so chooses, for example for power saving purposes, deactivate those antenna panels or other hardware required for reception of corresponding (reference) signals.

At block 1040, UE 110 may receive from the network 100, either via MAC-CE or RRC signaling, instructions to activate/deactivate selected TCI Mask(s). Alternatively the activation may be done, implicitly based on PDCCH scheduling, by using TCI index associated to a given mask.

FIGS. 9 and 10 provide example embodiment of UE 110 panel aware active TCI state determination based on UE 110 panel based beam reporting.

Figure 11:
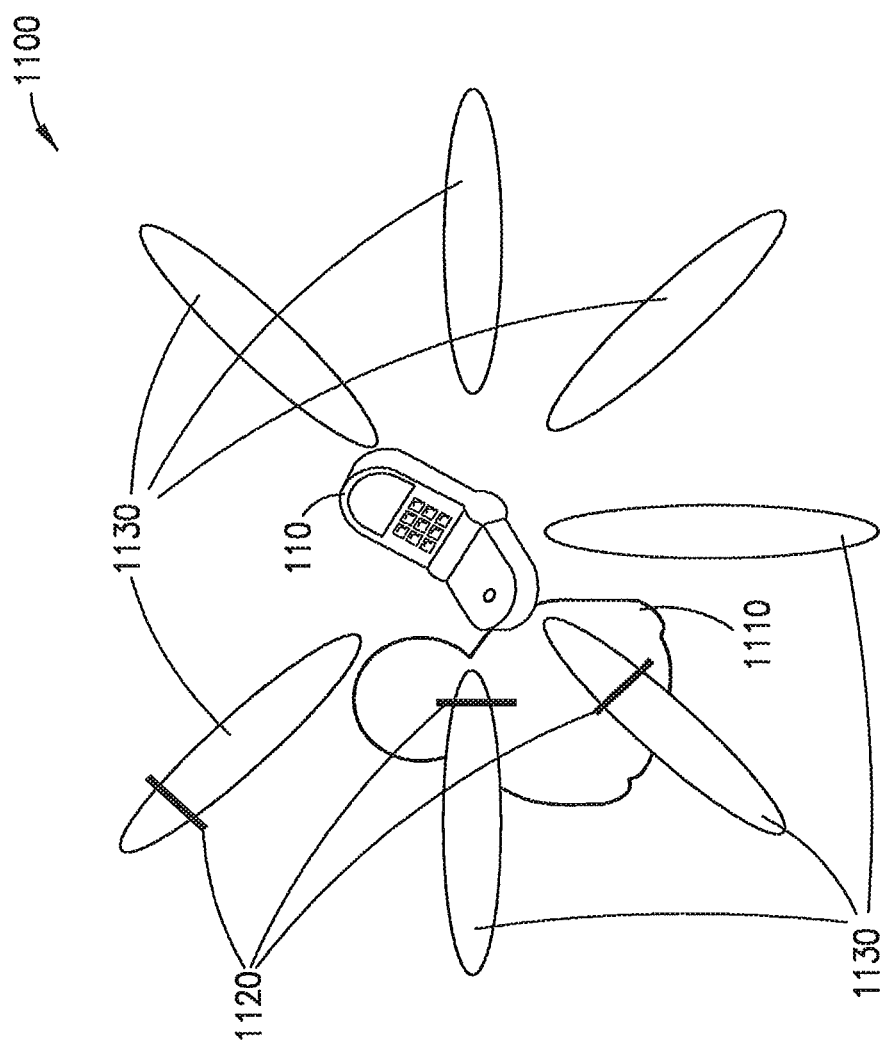
FIG. 11 shows an example illustration of UE beams in the presence of a user.

FIG. 11 shows an example illustration 1100 of UE 110 beams in the presence of a user 1110.

As shown in FIG. 11, there is a maximum radiated power allowed by safety emission limit 1120, which may be determined based on the Equivalent Isotropically Radiated Power (EIRP). The safe EIRP level (for a user 1110) is a function of UE 110 position relative to the user 1110, UE 110 beam 1130 direction and side-lobe levels and user 1110 proximity. UE 110 beams 1130 may radiate in all directions (in the presence of the user 1110).

According to an example embodiment, a separate beam reporting may be considered for determining feasible transmit beams at gNB 170 for downlink transmission between gNB 170 and UE 110 and feasible transmit beams at UE 110 for uplink transmission between UE 110 and gNB 170, where determining is based on downlink references signals corresponding to transmit beams and receive beams at gNB 170. That is assuming that UE 110 is able to determine transmit beam from receive beam. The reason for separate beam reporting for determining feasible "downlink beam pair links" and feasible "uplink beam pair links," where downlink beam pair links consist of transmit beam at gNB 170 and receive beam at UE 110, and uplink beam pair links consist of transmit beam at UE 110 and receive beam at gNB 170, is a possible issue related to emission safety at UE 110 when UE 110 transmitter uses beam forming.

The basic problem as illustrated in FIG. 11, is that certain UE 110 beams may be directed towards the head/body of the user 1110, resulting in risk of exceeding the said emission limits. That may lead to a problem that the same beam pair links may not be always available for downlink and uplink. In other words, some downlink beam pair links may provide very strong connection, while using the same beam pair links for uplink may not provide strong connection because the UE 110 may be forced to limit its transmission power due to emission limit to the direction of beam pair links in uplink.

Figure 12:
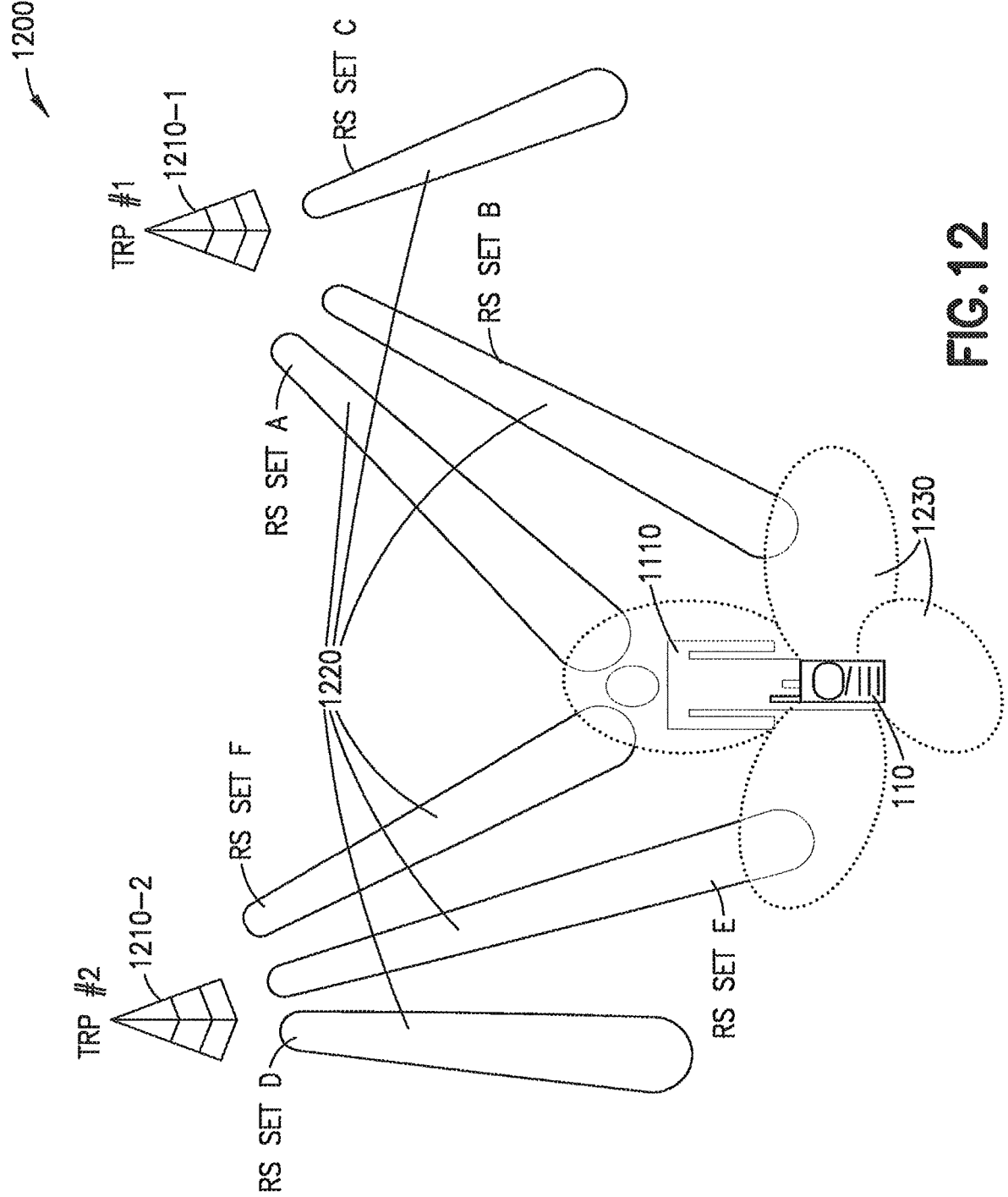
FIG. 12 shows an example illustration of DL RS beams and UE beams.

FIG. 12 shows an example illustration 1200 of sets of DL RS beams 1220 and UE 110 RX beams 1230.

As illustrated in FIG. 12, certain gNB 170 TX beams (for example, from TRP #1 1210-1 and TRP #2 1210-2) represented as sets of DL RS beams 1220 may have human body 1110 as a blocker between the gNB 170 TX and corresponding UE 110 RX beams 1230. Depending on the propagation conditions, these beams could still have good observed RSRP (for example, even when assuming body loss of 3 dB) AND resulting low pathloss (PL) estimate. Due to UE 110 requiring additional maximum power reduction (MPR), P-MPR, to meet the emission related requirements (for example, electromagnetic energy absorption requirements), the actual achievable PL for a given UL resource allocation will be reduced compared to the level that could be estimated based on the DL RSRP.

Figure 13B:
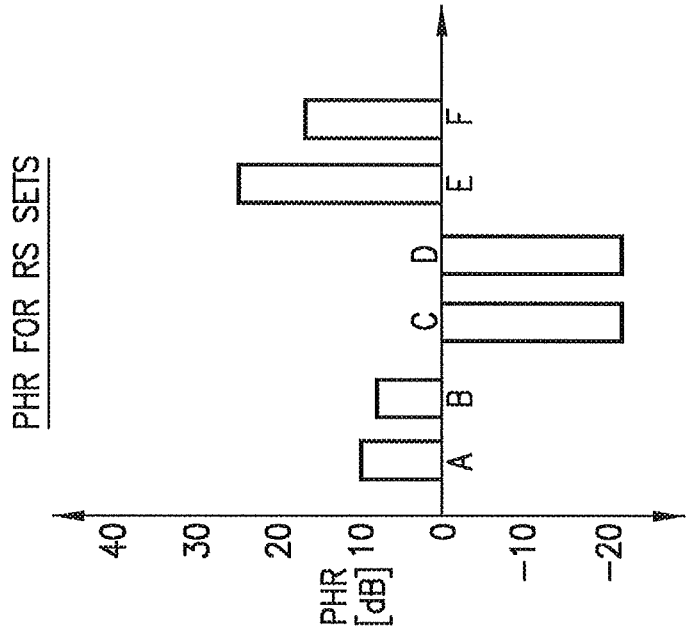
FIG. 13B shows an example illustration of measured PHR accounting the MPR required to meet emission requirements.
Figure 13A:
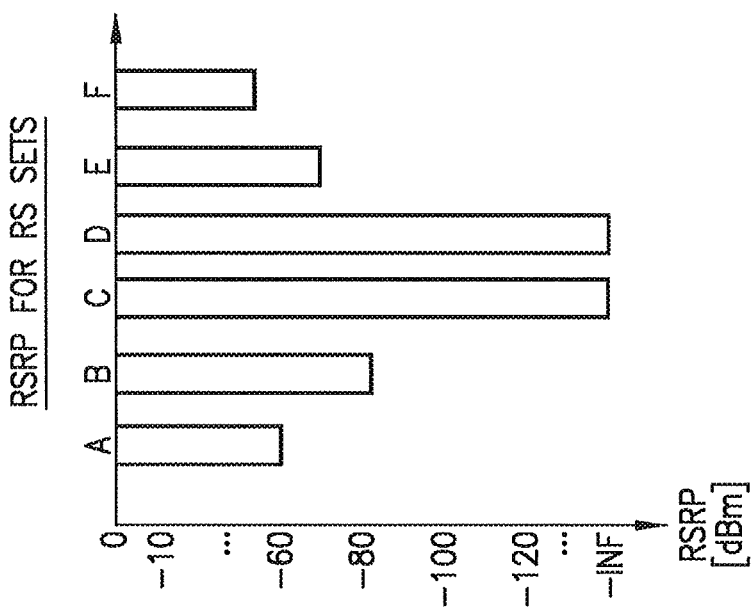
FIG. 13A shows an example illustration of measured RSRP PHR accounting the MPR required to meet emission requirements.

FIGS. 13A and 13B show example illustrations of measured RSRP and PHR, respectively, accounting for the MPR required to meet emission requirements.

Hence, as illustrated in FIG. 13A (following from the discussion regarding FIG. 12, herein above), the measured RSRP of RS sets A and F would be the best (F>A), even when accounting for human body loss (for example, 3 to 5 dB) while the RSRP obtained based on other RS sets would be lower due to non-optimal beam alignment (for example, beam gain to the direction of the RS).

However, as illustrated by FIG. 13B, the power headroom (PHR) accounting both the PL estimate (based on RSRP) and the UE 110 determined configured maximum output power (including the effect of P-MPR), the order of superiority of the beams may be changed. For example, assuming that for RS sets A and F, UE 110 may be required to restrict the maximum transmit power significantly (apply P-MPR) to comply with electromagnetic energy absorption requirements (emission limits), the RS set E would be best from UL perspective.

Figure 14:
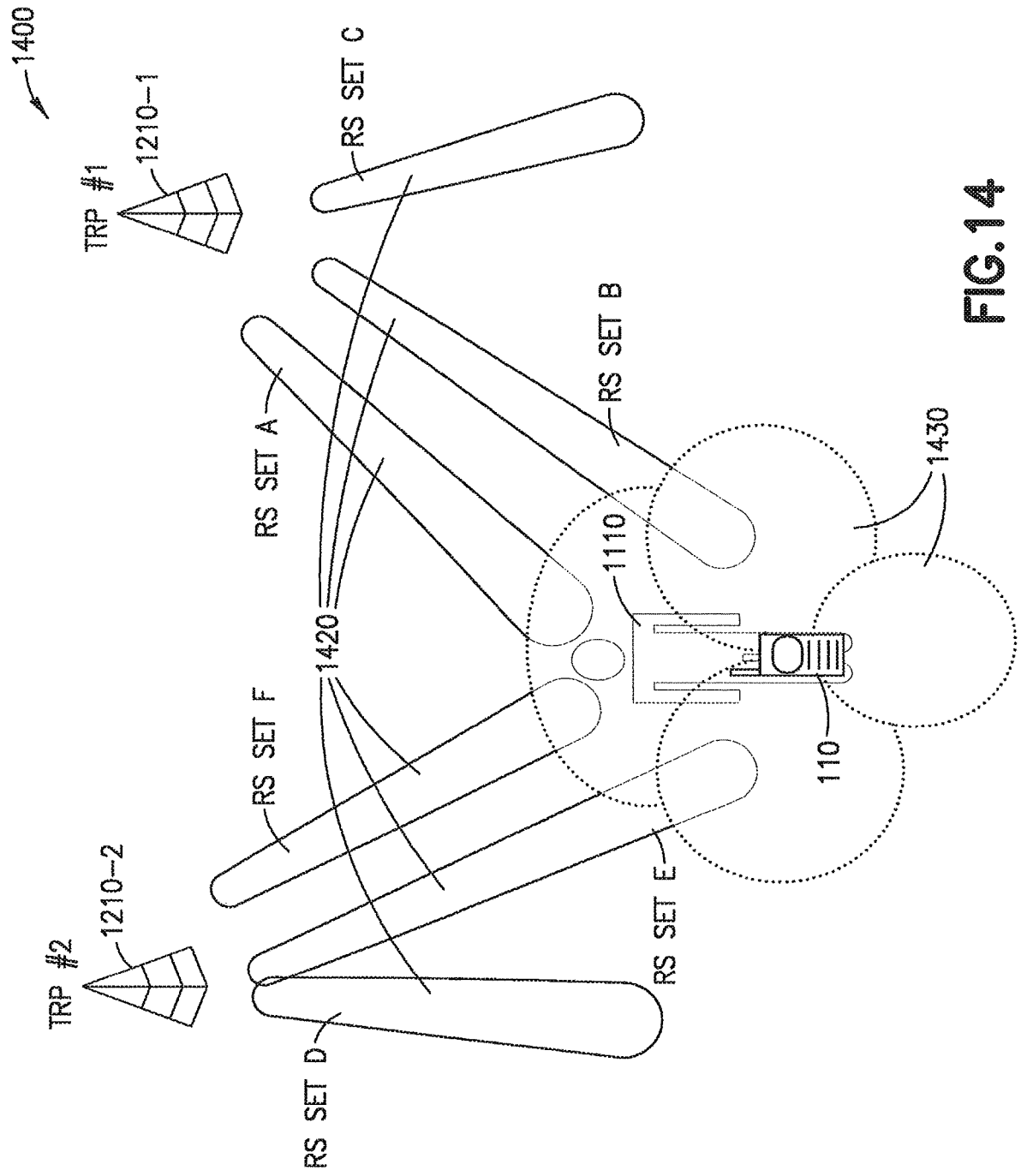
FIG. 14 shows an example illustration of a DL RS beams and UE beams, where beams are spatially overlapping.

FIG. 14 shows an example illustration 1400 of sets of DL RS beams 1420 and UE RX beams 1430, where RX beams 1430 are spatially overlapping. For example, RS beams may be heard in multiple RX beams 1430.

FIG. 14 illustrates an example scenario in which a same DL RS can be heard through multiple UE 110 RX beams 1430, resulting in possibly different RSRP and PHR value pairs.

In a certain sense this may be seen as a problem of reciprocity introduced in a dynamic manner by 'non-reciprocal' blocker. In other words, a problem of reciprocity introduced is separate from transmit and receive beam correspondence (means that UE 110 can determine TX beam from its RX beam 1430) and is separate from non-beam-correspondence at the UE 110 (in the sense that now the UE 110 TX beam can still be determined from DL RS), as the best possible UE 110 TX beams may not be corresponding to RX beams 1430 used to receive best DL TX beams.

One possible way to determine suitable UL transmit (TX) beams (and uplink beam pair links), which would be required for UEs 110 not able to determine transmit (TX) beams from receive (RX) beams, would be to configure UE 110 with multiple uplink sounding reference signal (SRS)

resources for which the UE 110 can try different TX beams and the gNB 170 based on measurements from SRS transmissions would determine the best SRS resources and thus best TX beams to be used in UL. However, from the system operation point of view, the use of SRSs for beam management is seen as a significant overhead. Thus, it's considered that beam management related operations for both DL and UL directions at both gNB 170 and UE 110 should be performed only based on DL RSs (thus requiring UEs 110 to have beam correspondence capability as well).

Additional example embodiments may be used to determine separately downlink and uplink beam pair links. The UE 110 may be configured to provide beam reports separately to indicate which downlink RSs are good to determine feasible downlink beam pair links and which downlink RSs are good to determine feasible uplink beam pair links.

According to an example embodiment, for determining which downlink RSs are good to determine feasible downlink beam pair links, the UE 110 may be configured for normal L1-RSRP reporting calculated on configured SS/PBCH and/or CSI-RS resources.

According to an example embodiment, for determining which downlink RSs are good to determine feasible uplink beam pair links, the UE 110 may be configured to provide L1-RSRP reports for the configured SS/PBCH and/or CSI-RS resources which are best from uplink beam pair links determination point of view.

According to an example embodiment, the UE 110 may be configured for determining which downlink RSs are good to determine feasible uplink beam pair links can be based on, for example, UE's 110 calculation of power headroom for each configured downlink RS for measurement (where power headroom indicates how much transmission power is left for a UE 110 to use in addition to the power being used by the transmission in UL and where power headroom calculation is expected to take into account also reduction in transmission power due to regulated emission limits, among other power reductions). UE 110 may be configured with (and/or, in some instances to determine) parameters such as a reference transmission bandwidth and target transmit power for a bandwidth unit, based on which the UE 110 may calculate the power headroom.

The UE 110 may rank the DL RSs conditioned on virtual power headroom per DL RS, for example, the best ones may be the ones which have the highest power headroom calculated.

In addition, the UE 110 may provide, together with the best RSRP values ranked using power headroom calculations, the UE's 110 RX panel index to indicate to the gNB 170 which UE 110 antenna panel has been used to measure reported best RSRP values in power headroom sense. That may assist gNB 170 to optimize beam indication for both DL and UL in a way that UE 110 may use a minimum number of panels at a time to save power at the UE 110.

In another example embodiment to determine possible different beam pair links to downlink and uplink, in case the UE 110 is not able to transmit on the UL TX beam associated with the best DL RS based on calculated L1-RSRP value, the UE 110 may indicate to the gNB 170 the existence of the UL beam (for example, DL RSs having good L1-RSRP value and thus being good downlink beam pair links) which cannot be used. This may trigger gNB 170 to allocate UE 110 with multiple UL resources to provide UE 110 with more opportunities for UL transmission to the direction allowing enough high TX power. Resource allocation may include downlink RSs as source RSs for the UE 110 to determine possible TX beams and similarly the gNB 170 is able to determine its RX beam for the reception on each UL resource.

Without in any way limiting the scope, interpretation, or application of the claims appearing below, a technical effect of one or more of the example embodiments disclosed herein is to enable controlled means for gNB 170 to enable power saving at UE 110 in terms of which panels UE 110 may be required to have active at a time. Another technical effect is that the gNB 170 is able to make transmit beam selection so that UE 110 power consumption may be improved compared to functionality that is not aware how many panels need to keep active at a time, for example, pure Re115 preceding functionality. Another technical effect is that gNB 170 may optimize use of UE's 110 panels by, for example, aiming at activating TCI states that require minimum number of UE 110 panels active at a time.

An example embodiment may provide a method comprising providing, from a user device, at least one beam report to a base station indicating a particular panel tag to use for measuring a particular beam management source reference signal; receiving, with the user device, from the base station, configuration of a transmission configuration indication table for the user device, wherein the configuration is based on the at least one beam report, wherein the transmission configuration indication table comprises states associated with at least one source reference signal measured with at least one of one or more receiver panels of the user device; and determining, with the user device, when activating at least one particular source reference signal for a control resource set, that only a transmission configuration indication state sharing a same panel tag with the at least one particular source reference signal is to be used for physical downlink shared channel beam indication.

In accordance with the example embodiments as described in the paragraphs above, deactivating at least one transmission configuration indication state with which the at least one particular source reference signal does not share the same panel tag.

In accordance with the example embodiments as described in the paragraphs above, wherein each panel tag includes an indication of a set of spatial filters that the user device is able to use simultaneously.

In accordance with the example embodiments as described in the paragraphs above, omitting, with the user device, the particular panel tag, wherein the user device is capable of receiving simultaneously with all of the one or more receiver panels of the user device.

In accordance with the example embodiments as described in the paragraphs above, determining, with the user device, at least one semi-persistent resource does not share the same panel tag; and deactivating, with the user device, the at least one semi-persistent resource.

In accordance with the example embodiments as described in the paragraphs above, determining the user device is configured with a higher layer parameter group-based-beam-reporting set to off; and receiving, at the user device, a configuration that the user device is only required to update measurements for a predetermined number of resources in a single reporting instance.

In accordance with the example embodiments as described in the paragraphs above, determining the user device is configured with a higher layer parameter group-based-beam-reporting set to on; and receiving, at the user device, a configuration that the user device is only required to update measurements for a predetermined number of resources.

In accordance with the example embodiments as described in the paragraphs above, wherein the user device is configured to report in a single reporting instance two different resources for each report setting and a corresponding receiver panel tag.

In accordance with the example embodiments as described in the paragraphs above, wherein the user device is configured to receive resources simultaneously by at least one of: a single spatial domain receive filter, or multiple simultaneous spatial domain receive filters.

In accordance with the example embodiments as described in the paragraphs above, wherein the user device is configured to provide group based beam reports that indicate on which receiver panel of the one or more receiver panels the user device measured at least one configured beam management reference signal.

An example embodiment may provide a method comprising receiving configuration of a transmission configuration indication table; receiving configuration of at least one corresponding transmission configuration indication mask, wherein the at least one corresponding transmission configuration indication mask indicates at least one transmission configuration indication index applicable for physical downlink shared channel scheduling of a physical downlink control channel; and deactivating at least one antenna panel of one or more antenna panels of a user device required for reception of at least one corresponding reference signal.

In accordance with the example embodiments as described in the paragraphs above, receiving a signal deactivating at least one selected transmission configuration indication mask.

In accordance with the example embodiments as described in the paragraphs above, determining activation of the at least one particular transmission configuration indication mask based on physical downlink control channel scheduling, where the determining comprises using a particular transmission configuration indication index associated to the at least one particular transmission configuration indication mask.

In accordance with the example embodiments as described in the paragraphs above, indicating a subset of the one or more antenna panels that the user device is capable of activating at a same time.

In accordance with another example, an example apparatus comprises: means for providing, from the apparatus, at least one beam report to a base station indicating a particular panel tag to use for measuring a particular beam management source reference signal; means for receiving, by the apparatus, from the base station, configuration of a transmission configuration indication table for the apparatus, wherein the configuration is based on the at least one beam report, wherein the transmission configuration indication table comprises one or more transmission configuration indication states associated with at least one source reference signal measured with at least one of one or more receiver panels of the apparatus; and means for determining, when activating at least one particular source reference signal for a control resource set, that only a transmission configuration indication state sharing a same panel tag with the at least one particular source reference signal is to be used for physical downlink shared channel beam indication.

In accordance with the example embodiments as described in the paragraphs above, deactivating at least one transmission configuration indication state with which the at least one particular source reference signal does not share the same panel tag.

In accordance with the example embodiments as described in the paragraphs above, wherein each panel tag includes an indication of a set of spatial filters that the apparatus is able to use simultaneously.

In accordance with the example embodiments as described in the paragraphs above, means for omitting the particular panel tag, wherein the apparatus is capable of receiving simultaneously with all of the one or more receiver panels of the apparatus.

In accordance with the example embodiments as described in the paragraphs above, determining at least one semi-persistent resource does not share the same panel tag; and deactivating the at least one semi-persistent resource.

An example embodiment may be provided in an apparatus means for receiving configuration of a transmission configuration indication table; means for receiving configuration of at least one corresponding transmission configuration indication mask, wherein the at least one corresponding transmission configuration indication mask indicates at least one transmission configuration indication index applicable for physical downlink shared channel scheduling of a physical downlink control channel; and means for deactivating at least one antenna panel of one or more antenna panels of the apparatus required for reception of at least one corresponding reference signal.

In accordance with the example embodiments as described in the paragraphs above, means for receiving a signal deactivating at least one selected transmission configuration indication mask.

In accordance with the example embodiments as described in the paragraphs above, means for determining activation of at least one particular transmission configuration indication mask based on physical downlink control channel scheduling, where the determining comprises using a particular transmission configuration indication index associated to the at least one particular transmission configuration indication mask.

In accordance with the example embodiments as described in the paragraphs above, means for indicating a subset of the one or more antenna panels that the apparatus is capable of activating at a same time.

An example embodiment may be provided in an apparatus comprising: at least one processor; and at least one non-transitory memory including computer program code, the at least one non-transitory memory and the computer program code configured to, with the at least one processor, cause the apparatus to: receive configuration of a transmission configuration indication table; receive configuration of at least one corresponding transmission configuration indication mask, wherein the at least one corresponding transmission configuration indication mask indicates at least one transmission configuration indication index applicable for physical downlink shared channel scheduling of a physical downlink control channel; and deactivate at least one antenna panel of one or more antenna panels of the apparatus required for reception of at least one corresponding reference signal.

In accordance with the example embodiments as described in the paragraphs above, receive a signal deactivating at least one selected transmission configuration indication mask.

In accordance with the example embodiments as described in the paragraphs above, determine activation of at least one particular transmission configuration indication mask based on physical downlink control channel scheduling, where the determining comprises using a particular transmission configuration indication index associated to the at least one particular transmission configuration indication mask.

In accordance with the example embodiments as described in the paragraphs above, indicate a subset of the one or more antenna panels that the apparatus is capable of activating at a same time.

An example embodiment may be provided in an apparatus comprising a non-transitory program storage device readable by a machine, tangibly embodying a program of instructions executable by the machine for performing operations, the operations comprising: receiving configuration of a transmission configuration indication table; receiving configuration of at least one corresponding transmission configuration indication mask, wherein the at least one corresponding transmission configuration indication mask indicates at least one transmission configuration indication index applicable for physical downlink shared channel scheduling of a physical downlink control channel; and deactivating at least one antenna panel of one or more antenna panels of the apparatus required for reception of at least one corresponding reference signal.

In accordance with the example embodiments as described in the paragraphs above, receiving a signal deactivating at least one selected transmission configuration indication mask.

In accordance with the example embodiments as described in the paragraphs above, determining activation of at least one particular transmission configuration indication mask based on physical downlink control channel scheduling, where the determining comprises using a particular transmission configuration indication index associated to the at least one particular transmission configuration indication mask.

In accordance with the example embodiments as described in the paragraphs above, indicating a subset of the one or more antenna panels that the apparatus is capable of activating at a same time.

An example embodiment may be provided in an apparatus comprising at least one processor; and at least one non-transitory memory including computer program code, the at least one non-transitory memory and the computer program code may be configured to, with the at least one processor, cause the apparatus to: provide at least one beam report to a base station indicating a particular panel tag to use for measuring a particular beam management source reference signal; receive from the base station configuration of a transmission configuration indication table for the apparatus, wherein the configuration is based on the at least one beam report, wherein the transmission configuration indication table comprises states associated with at least one source reference signal measured with at least one of one or more receiver panels of the apparatus; and determine, when activating at least one particular source reference signal for a control resource set, that only a transmission configuration indication state sharing a same panel tag with the at least one particular source reference signal is to be used for physical downlink shared channel beam indication.

In accordance with the example embodiments as described in the paragraphs above, where the apparatus is further configured to: deactivate at least one transmission configuration indication state with which the at least one particular source reference signal does not share the same panel tag.

In accordance with the example embodiments as described in the paragraphs above, wherein each panel tag includes an indication of a set of spatial filters that the apparatus is able to use simultaneously.

In accordance with the example embodiments as described in the paragraphs above, where the apparatus is further configured to: omit the particular panel tag, wherein the apparatus is capable of receiving simultaneously with all of the one or more receiver panels of the apparatus.

In accordance with the example embodiments as described in the paragraphs above, where the apparatus is further configured to: determine at least one semi-persistent resource does not share the same panel tag; and deactivate the at least one semi-persistent resource.

An example embodiment may be provided in an apparatus comprising a non-transitory program storage device readable by a machine, tangibly embodying a program of instructions executable by the machine for performing operations, the operations comprising: providing at least one beam report to a base station indicating a particular panel tag to use for measuring a particular beam management source reference signal; receiving from the base station configuration of a transmission configuration indication table for the apparatus, wherein the configuration is based on the at least one beam report, wherein the transmission configuration indication table comprises states associated with at least one source reference signal measured with at least one of one or more receiver panels of the apparatus; and determining, when activating at least one particular source reference signal for a control resource set, that only a transmission configuration indication state sharing a same panel tag with the at least one particular source reference signal is to be used for physical downlink shared channel beam indication.

In accordance with the example embodiments as described in the paragraphs above, deactivating at least one transmission configuration indication state with which the at least one particular source reference signal does not share the same panel tag.

In accordance with the example embodiments as described in the paragraphs above, each panel tag includes an indication of a set of spatial filters that the apparatus is able to use simultaneously.

In accordance with the example embodiments as described in the paragraphs above, omitting the particular panel tag, wherein the apparatus is capable of receiving simultaneously with all of the one or more receiver panels of the apparatus.

In accordance with the example embodiments as described in the paragraphs above, determining at least one semi-persistent resource does not share the same panel tag; and deactivating the at least one semi-persistent resource.

An example embodiment may provide a method comprising receiving, at a user device, a configuration for beam reporting, where the configuration comprises one of: an indication to provide separate reporting for downlink beam selection and uplink beam selection; or an indication to provide reporting for uplink beam selection.

In accordance with the example embodiments as described in the paragraphs above, where the configuration comprises the indication to provide reporting for uplink beam selection, further comprising: receiving, at the user device, one or more downlink reference signals; calculating a reference signal received power value for each of the one or more downlink reference signals; determining one or more of the one or more downlink reference signals for uplink beam selection based, at least partially, on the respective reference signal received power value for each of the one or more downlink reference signals; and reporting the determined one or more of the one or more downlink reference signals.

In accordance with the example embodiments as described in the paragraphs above, wherein the determining further comprises calculating a power headroom value for each of the one or more downlink reference signals.

In accordance with the example embodiments as described in the paragraphs above, where calculating the power headroom value for each of the one or more downlink reference signals is based, at least partially, on one or more of: a value by which a transmission power of a respective downlink reference signal is reduced based on at least one regulated emission limit, a reference transmission bandwidth, and/or a target transmit power value for a bandwidth unit.

In accordance with the example embodiments as described in the paragraphs above, where the determining further comprises ranking the one or more downlink reference signals based on the respective power headroom values.

In accordance with the example embodiments as described in the paragraphs above, where the ranking comprises ranking the one or more downlink reference signals from a downlink reference signal having a highest respective power headroom value to a downlink reference signal having a lowest respective power headroom value.

In accordance with the example embodiments as described in the paragraphs above, where the reporting comprises reporting the determined one or more of the one or more downlink reference signals according to the ranking.

In accordance with the example embodiments as described in the paragraphs above, where the reporting further comprises including an indication of a user device panel used to measure each of the determined one or more of the one or more downlink reference signals.

In accordance with the example embodiments as described in the paragraphs above, where the indication of each user device panel comprises a panel identifier.

In accordance with the example embodiments as described in the paragraphs above, where the indication of each user device panel comprises a panel index.

In accordance with the example embodiments as described in the paragraphs above, further comprising: determining one or more uplink beams cannot be used based, at least partially, on at least one emission limit, where the reporting further comprises an indication of the determined one or more uplink beams that cannot be used.

In accordance with the example embodiments as described in the paragraphs above, further comprising: receiving, in response to the indication of the determined one or more uplink beams that cannot be used, an allocation comprising a plurality of uplink resources.

In accordance with another example, an example apparatus comprises: means for receiving a configuration for beam reporting, where the configuration comprises one of: an indication to provide separate reporting for downlink beam selection and uplink beam selection; or an indication to provide reporting for uplink beam selection.

In accordance with the example embodiments as described in the paragraphs above, where the configuration comprises the indication to provide reporting for uplink beam selection, further comprising: means for receiving one or more downlink reference signals; means for calculating a reference signal received power value for each of the one or more downlink reference signals; means for determining one or more of the one or more downlink reference signals for uplink beam selection based, at least partially, on the respective reference signal received power value for each of the one or more downlink reference signals; and means for reporting the determined one or more of the one or more downlink reference signals.

In accordance with the example embodiments as described in the paragraphs above, wherein the determining further comprises calculating a power headroom value for each of the one or more downlink reference signals.

In accordance with the example embodiments as described in the paragraphs above, where calculating the power headroom value for each of the one or more downlink reference signals is based, at least partially, on one or more of: a value by which a transmission power of a respective downlink reference signal is reduced based on at least one regulated emission limit, a reference transmission bandwidth, and/or a target transmit power value for a bandwidth unit.

In accordance with the example embodiments as described in the paragraphs above, where the determining further comprises ranking the one or more downlink reference signals based on the respective power headroom values.

In accordance with the example embodiments as described in the paragraphs above, where the ranking comprises ranking the one or more downlink reference signals from a downlink reference signal having a highest respective power headroom value to a downlink reference signal having a lowest respective power headroom value.

In accordance with the example embodiments as described in the paragraphs above, where the reporting comprises reporting the determined one or more of the one or more downlink reference signals according to the ranking.

In accordance with the example embodiments as described in the paragraphs above, where the reporting further comprises including an indication of a user device panel used to measure each of the determined one or more of the one or more downlink reference signals.

In accordance with the example embodiments as described in the paragraphs above, where the indication of each user device panel comprises a panel identifier.

In accordance with the example embodiments as described in the paragraphs above, where the indication of each user device panel comprises a panel index.

In accordance with the example embodiments as described in the paragraphs above, further comprising: means for determining one or more uplink beams cannot be used based, at least partially, on at least one emission limit, where the reporting further comprises an indication of the determined one or more uplink beams that cannot be used.

In accordance with the example embodiments as described in the paragraphs above, further comprising: means for receiving, in response to the indication of the determined one or more uplink beams that cannot be used, an allocation comprising a plurality of uplink resources.

An example embodiment may be provided in an apparatus comprising: at least one processor; and at least one non-transitory memory including computer program code, the at least one non-transitory memory and the computer program code configured to, with the at least one processor, cause the apparatus to: receive a configuration for beam reporting, where the configuration comprises one of: an indication to provide separate reporting for downlink beam selection and uplink beam selection; or an indication to provide reporting for uplink beam selection.

In accordance with the example embodiments as described in the paragraphs above, where the configuration comprises the indication to provide reporting for uplink beam selection, further configured to: receive one or more downlink reference signals; calculate a reference signal received power value for each of the one or more downlink reference signals; determine one or more of the one or more downlink reference signals for uplink beam selection based, at least partially, on the respective reference signal received power value for each of the one or more downlink reference signals; and report the determined one or more of the one or more downlink reference signals.

In accordance with the example embodiments as described in the paragraphs above, wherein the determining further comprises calculating a power headroom value for each of the one or more downlink reference signals.

In accordance with the example embodiments as described in the paragraphs above, where calculating the power headroom value for each of the one or more downlink reference signals is based, at least partially, on one or more of: a value by which a transmission power of a respective downlink reference signal is reduced based on at least one regulated emission limit, a reference transmission bandwidth, and/or a target transmit power value for a bandwidth unit.

In accordance with the example embodiments as described in the paragraphs above, where the determining further comprises ranking the one or more downlink reference signals based on the respective power headroom values.

In accordance with the example embodiments as described in the paragraphs above, where the ranking comprises ranking the one or more downlink reference signals from a downlink reference signal having a highest respective power headroom value to a downlink reference signal having a lowest respective power headroom value.

In accordance with the example embodiments as described in the paragraphs above, where the reporting comprises reporting the determined one or more of the one or more downlink reference signals according to the ranking.

In accordance with the example embodiments as described in the paragraphs above, where the reporting further comprises including an indication of a user device panel used to measure each of the determined one or more of the one or more downlink reference signals.

In accordance with the example embodiments as described in the paragraphs above, where the indication of each user device panel comprises a panel identifier.

In accordance with the example embodiments as described in the paragraphs above, where the indication of each user device panel comprises a panel index.

In accordance with the example embodiments as described in the paragraphs above, further configured to: determine one or more uplink beams cannot be used based, at least partially, on at least one emission limit, where the reporting further comprises an indication of the determined one or more uplink beams that cannot be used.

In accordance with the example embodiments as described in the paragraphs above, further configured to: receive, in response to the indication of the determined one or more uplink beams that cannot be used, an allocation comprising a plurality of uplink resources.

An example embodiment may be provided in an apparatus comprising: a non-transitory program storage device readable by a machine, tangibly embodying a program of instructions executable by the machine for performing operations, the operations comprising: receiving a configuration for beam reporting, where the configuration comprises one of: an indication to provide separate reporting for downlink beam selection and uplink beam selection; or an indication to provide reporting for uplink beam selection.

In accordance with the example embodiments as described in the paragraphs above, where the configuration comprises the indication to provide reporting for uplink beam selection, the operations further comprising: receiving one or more downlink reference signals; calculating a reference signal received power value for each of the one or more downlink reference signals; determining one or more of the one or more downlink reference signals for uplink beam selection based, at least partially, on the respective reference signal received power value for each of the one or more downlink reference signals; and reporting the determined one or more of the one or more downlink reference signals.

In accordance with the example embodiments as described in the paragraphs above, wherein the determining further comprises calculating a power headroom value for each of the one or more downlink reference signals.

In accordance with the example embodiments as described in the paragraphs above, where calculating the power headroom value for each of the one or more downlink reference signals is based, at least partially, on one or more of: a value by which a transmission power of a respective downlink reference signal is reduced based on at least one regulated emission limit, a reference transmission bandwidth, and/or a target transmit power value for a bandwidth unit.

In accordance with the example embodiments as described in the paragraphs above, where the determining further comprises ranking the one or more downlink reference signals based on the respective power headroom values.

In accordance with the example embodiments as described in the paragraphs above, where the ranking comprises ranking the one or more downlink reference signals from a downlink reference signal having a highest respective power headroom value to a downlink reference signal having a lowest respective power headroom value.

In accordance with the example embodiments as described in the paragraphs above, where the reporting comprises reporting the determined one or more of the one or more downlink reference signals according to the ranking.

In accordance with the example embodiments as described in the paragraphs above, where the reporting further comprises including an indication of a user device panel used to measure each of the determined one or more of the one or more downlink reference signals.

In accordance with the example embodiments as described in the paragraphs above, where the indication of each user device panel comprises a panel identifier.

In accordance with the example embodiments as described in the paragraphs above, where the indication of each user device panel comprises a panel index.

In accordance with the example embodiments as described in the paragraphs above, the operations further comprising: determining one or more uplink beams cannot be used based, at least partially, on at least one emission limit, where the reporting further comprises an indication of the determined one or more uplink beams that cannot be used.

In accordance with the example embodiments as described in the paragraphs above, the operations further comprising: receiving, in response to the indication of the determined one or more uplink beams that cannot be used, an allocation comprising a plurality of uplink resources.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, at a user device, from a network node, a configuration for beam reporting, where the configuration comprises one of:
   an indication to provide separate reporting of at least one determined measurement result or determined metric by the user device for downlink beam selection and uplink beam selection, or
   an indication to provide reporting of at least one determined measurement result or determined metric by the user device for uplink beam selection.

2. The method of claim 1, wherein the selection of the uplink beam is based on one or more downlink reference signals.

3. The method of claim 2, further comprising:
   calculating, for each of the one or more downlink reference signals, a value by which a transmission power of the user device is reduced based on at least one regulated emission limit.

4. The method of claim 3, wherein the selection of the uplink beam is based on the calculated one or more values.

5. The method of claim 2, where the reporting further comprises including an indication of a user device panel used to measure each of the determined one or more of the one or more downlink reference signals.

6. The method of claim 5, where the indication of each user device panel comprises a panel identifier or a panel index.

7. The method of claim 2, further comprising:
determining one or more uplink beams cannot be used based, at least partially, on at least one regulated emission limit, where the reporting further comprises an indication of the determined one or more uplink beams that cannot be used.

8. The method of claim 7, further comprising:
receiving, in response to the indication of the determined one or more uplink beams that cannot be used, an allocation comprising a plurality of uplink resources.

9. The method of claim 2, further comprising:
calculating a reference signal received power value for the one or more downlink reference signals;
determining one or more of the one or more downlink reference signals for uplink beam selection based, at least partially, on the respective reference signal received power value for the one or more downlink reference signals; and
reporting the determined one or more of the one or more downlink reference signals.

10. The method of claim 1, wherein the uplink beam selection is for an uplink transmission beam.

11. The method of claim 10, wherein the uplink transmission beam is of the user device.

12. The method of claim 2, further comprising:
performing, by the user device, at least one measurement based on the one or more downlink reference signals; and
determining, by the user device, at least one measurement result based on the at least one measurement based on the one or more downlink reference signals;
wherein the reporting for the uplink beam selection comprises the at least one measurement result based on the at least one measurement based on the one or more downlink reference signals.

13. An apparatus, comprising:
at least one processor; and
at least one memory storing instructions that, when executed by the at least one processor, cause the apparatus to:
receive, at a user device, from a network node, a configuration for beam reporting, where the configuration comprises one of:
an indication to provide separate reporting of at least one determined measurement result or determined metric by the user device for downlink beam selection and uplink beam selection, or
an indication to provide reporting of at least one determined measurement result or determined metric by the user device for uplink beam selection.

14. The apparatus of claim 13, wherein the selection of the uplink beam is based on one or more downlink reference signals.

15. The apparatus of claim 14, wherein the instructions, when executed by the at least one processor, cause the apparatus to calculate, for each of the one or more downlink reference signals, a value by which a transmission power of the user device is reduced based on at least one regulated emission limit.

16. The apparatus of claim 15, wherein the selection of the uplink beam is based on the calculated one or more values.

17. The apparatus of claim 15, wherein when determining the one or more downlink reference signals, the instructions, when executed by the at least one processor, cause the apparatus to rank the one or more downlink reference signals based on the calculated one or more values.

18. The apparatus of claim 17, wherein when ranking the one or more downlink reference signals, the instructions, when executed by the at least one processor, cause the apparatus to rank the one or more downlink reference signals from a downlink reference signal having a highest respective calculated value to a downlink reference signal having a lowest respective calculated value.

19. The apparatus of claim 17, wherein when reporting, the instructions, when executed by the at least one processor, cause the apparatus to report the determined one or more of the one or more downlink reference signals according to the ranking.

20. The apparatus of claim 14, wherein when reporting, the instructions, when executed by the at least one processor, cause the apparatus to include an indication of a user device panel used to measure each of the one or more downlink reference signals.

21. The apparatus of claim 20, where the indication of each user device panel comprises a panel identifier or a panel index.

22. The apparatus of claim 14, wherein the instructions, when executed by the at least one processor, cause the apparatus to:
determine one or more uplink beams cannot be used based, at least partially, on at least one regulated emission limit, where the reporting further comprises an indication of the determined one or more uplink beams that cannot be used.

23. The apparatus of claim 22, wherein the instructions, when executed by the at least one processor, cause the apparatus to:
receive, in response to the indication of the determined one or more uplink beams that cannot be used, an allocation comprising a plurality of uplink resources.

24. The apparatus of claim 14, wherein the instructions, when executed by the at least one processor, cause the apparatus to:
calculate a reference signal received power value for the one or more downlink reference signals;
determine one or more of the one or more downlink reference signals for uplink beam selection based, at least partially, on the respective reference signal received power value for the one or more downlink reference signals; and
report the determined one or more of the one or more downlink reference signals.

25. The apparatus of claim 14, wherein the instructions, when executed by the at least one processor, cause the apparatus at least to:
perform, by the user device, at least one measurement based on the one or more downlink reference signals; and
determine, by the user device, at least one measurement result based on the at least one measurement based on the one or more downlink reference signals;
wherein the reporting for the uplink beam selection comprises the at least one measurement result based on the at least one measurement based on the one or more downlink reference signals.

26. A non-transitory computer readable medium comprising program instructions stored thereon for performing operations comprising:

receiving, at a user device, from a network node, a configuration for beam reporting, where the configuration comprises one of:
- an indication to provide separate reporting of at least one determined measurement result or determined metric by the user device for downlink beam selection and uplink beam selection, or
- an indication to provide reporting of at least one determined measurement result or determined metric by the user device for uplink beam selection.

* * * * *